(12) United States Patent
Kamikawa

(10) Patent No.: US 7,227,691 B2
(45) Date of Patent: Jun. 5, 2007

(54) MULTI-BANDPASS FILTER

(75) Inventor: Sho Kamikawa, Hadano (JP)

(73) Assignees: Koshin Kogaku Co., Ltd., Kanagawa (JP); Yamaichi Electronics Co., Ltd., Tokyo (JP)

( * ) Notice: Subject to any disclaimer, the term of this patent is extended or adjusted under 35 U.S.C. 154(b) by 158 days.

(21) Appl. No.: 11/151,590

(22) Filed: Jun. 14, 2005

(65) Prior Publication Data

US 2006/0007547 A1    Jan. 12, 2006

(30) Foreign Application Priority Data

Jul. 9, 2004  (JP) .............................. 2004-202695

(51) Int. Cl.
  *G02B 1/10*  (2006.01)
  *G02B 5/28*  (2006.01)
(52) U.S. Cl. ...................... 359/588; 359/589
(58) Field of Classification Search ........ 359/584–589; 356/519; 372/97
  See application file for complete search history.

(56) References Cited

U.S. PATENT DOCUMENTS 5,926,317 A * 7/1999 Cushing ...................... 359/588
6,631,033 B1 * 10/2003 Lewis ........................ 359/584

* cited by examiner

*Primary Examiner*—Alessandro Amari
(74) *Attorney, Agent, or Firm*—Banner & Witcoff, Ltd.

(57) ABSTRACT

Several embodiments of multi-bandpass filters for processing optical signals are shown. The filters may include a transparent substrate with a thin film superimposed thereon. The thin film may have mirror layers and cavity layers, and may have multiple kinds of dielectrics with different refractive indices. The optical film may have a thickness that is a quarter of a reference wavelength, so as to form a plurality of Fabry-Perrot interferometer structures, and may have multiple groups of superimposed mirror and cavity layers depending on the desired effect. By using the described filters, the isolation between a plurality of the transmission bands can be sufficiently large, and separation of lights in a plurality of different wavelength regions can be carried out through a single multi-bandpass filter.

10 Claims, 25 Drawing Sheets

FIG. 26

| | LAYER | MATERIAL | THICKNESS (λ/4) |
|---|---|---|---|
| OUTSIDE MEDIUM | | AIR(n=1.00) | |
| (M) | 1 | H | 2.21 |
| | 2 | L | 1.21 |
| (C) | 3 | H | 1.67 |
| | 4 | L | 2.07 |
| (M) | 5 | H | 0.21 |
| | 6 | L | 1.14 |
| (C) | 7 | H | 1.28 |
| | 8 | L | 1.98 |
| (M) | 9 | H | 0.94 |
| | 10 | L | 0.53 |
| (T) | 11 | H | 1.83 |
| | 12 | L | 0.74 |
| M | 13 | H | 1 |
| | 14 | L | 1 |
| | 15 | H | 1 |
| C | 16 | L | 2 |
| M | 17 | H | 1 |
| | 18 | L | 1 |
| | 19 | H | 1 |
| C | 20 | L | 2 |
| M | 21 | H | 1 |
| | 22 | L | 1 |
| | 23 | H | 1 |
| T | 24 | L | 1 |
| M | 25 | H | 1 |
| | 26 | L | 1 |
| | 27 | H | 1 |
| C | 28 | L | 2 |
| M | 29 | H | 1 |
| | 30 | L | 1 |
| | 31 | H | 1 |

| | LAYER | MATERIAL | THICKNESS (λ/4) |
|---|---|---|---|
| C | 32 | L | 2 |
| M | 33 | H | 1 |
| | 34 | L | 1 |
| | 35 | H | 1 |
| T | 36 | L | 1 |
| M | 37 | H | 1 |
| | 38 | L | 1 |
| | 39 | H | 1 |
| C | 40 | L | 2 |
| M | 41 | H | 1 |
| | 42 | L | 1 |
| | 43 | H | 1 |
| C | 44 | L | 2 |
| M | 45 | H | 1 |
| | 46 | L | 1 |
| | 47 | H | 1 |
| T | 48 | L | 1 |
| (M) | 49 | H | 0.67 |
| | 50 | L | 1.68 |
| (C) | 51 | H | 1.08 |
| | 52 | L | 1.62 |
| (M) | 53 | H | 1.53 |
| | 54 | L | 0.8 |
| (C) | 55 | H | 0.62 |
| | 56 | L | 2.46 |
| (M) | 57 | H | 0.79 |
| | 58 | L | 0.49 |
| (T) | 59 | H | 1.18 |
| | 60 | L | 0.57 |
| SUBSTRATE2a | | GLASS(n=1.52) | |

FIG. 27
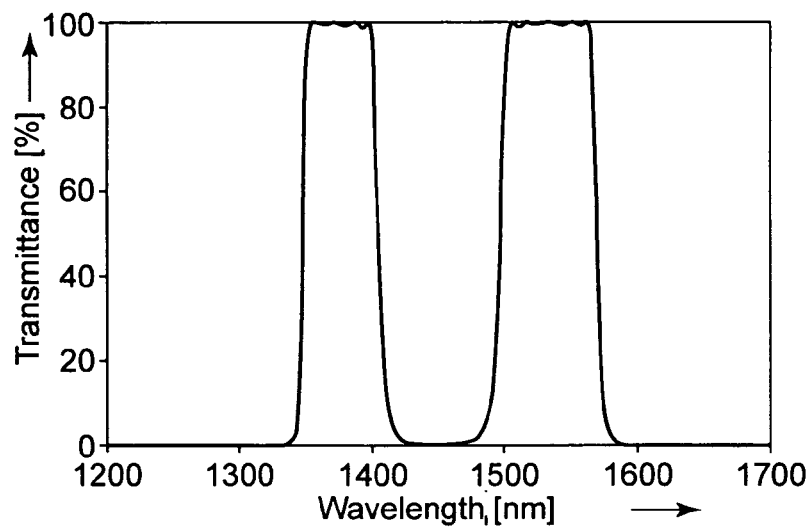
FIG. 28(a)
| LAYER | THICKNESS ($\lambda/4$) |
|---|---|
| 1 | H |
| 2 | L |
| 3 | H |
| 4 | L |
| 5 | H |
| 6 | 4L |
| 7 | H |
| 8 | L |
| 9 | H |
| 10 | 2L |
| 11 | H |
| 12 | 6L |
| 13 | H |
| 14 | 2L |
| 15 | H |
| 16 | L |
| 17 | H |
| 18 | 4L |
| 19 | H |
| 20 | L |
| 21 | H |
| 22 | L |
| 23 | H |
| 24 | L |
FIG. 28(b)
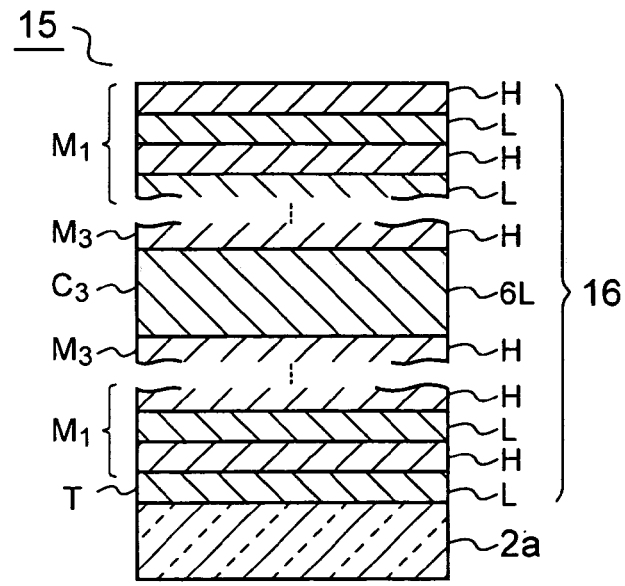

| | LAYER | THICKNESS (λ/4) | LAYER | THICKNESS (λ/4) | LAYER | THICKNESS (λ/4) |
|---|---|---|---|---|---|---|
| OUTSIDE MEDIUM | | AIR | | | | |
| $M_1$ | 1 | H | 25 | H | 49 | H |
| | 2 | L | 26 | L | 50 | L |
| | 3 | H | 27 | H | 51 | H |
| | 4 | L | 28 | L | 52 | L |
| | 5 | H | 29 | H | 53 | H |
| $C_1$ | 6 | 4L | 30 | 4L | 54 | 4L |
| $M_2$ | 7 | H | 31 | H | 55 | H |
| | 8 | L | 32 | L | 56 | L |
| | 9 | H | 33 | H | 57 | H |
| $C_2$ | 10 | 2L | 34 | 2L | 58 | 2L |
| $M_3$ | 11 | H | 35 | H | 59 | H |
| $C_3$ | 12 | 6L | 36 | 6L | 60 | 6L |
| $M_3$ | 13 | H | 37 | H | 61 | H |
| $C_2$ | 14 | 2L | 38 | 2L | 62 | 2L |
| $M_2$ | 15 | H | 39 | H | 63 | H |
| | 16 | L | 40 | L | 64 | L |
| | 17 | H | 41 | H | 65 | H |
| $C_1$ | 18 | 4L | 42 | 4L | 66 | 4L |
| $M_1$ | 19 | H | 43 | H | 67 | H |
| | 20 | L | 44 | L | 68 | L |
| | 21 | H | 45 | H | 69 | H |
| | 22 | L | 46 | L | 70 | L |
| | 23 | H | 47 | H | 71 | H |
| T | 24 | L | 48 | L | 74 | L |
| | | | | | SUBSTRATE 2a | GLASS |

FIG. 31
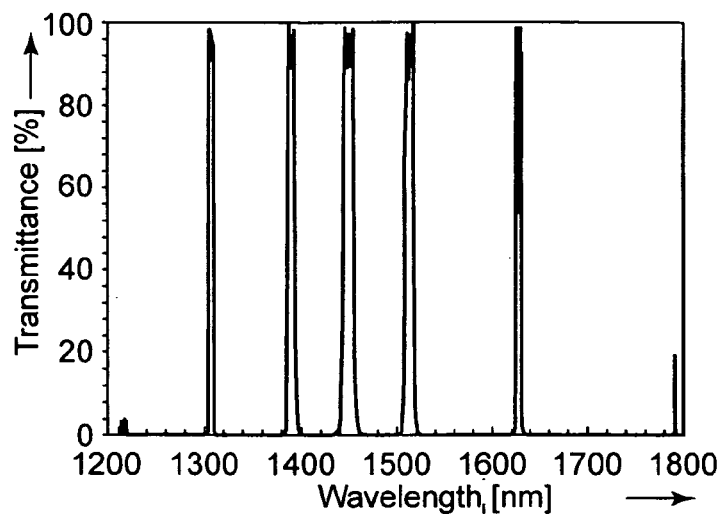
FIG. 32(a)
| LAYER | THICKNESS ($\lambda/4$) |
|---|---|
| 1 | H |
| 2 | L |
| 3 | H |
| 4 | 4L |
| 5 | H |
| 6 | L |
| 7 | H |
| 8 | 2L |
| 9 | H |
| 10 | L |
| 11 | H |
| 12 | 6L |
| 13 | H |
| 14 | L |
| 15 | H |
| 16 | 2L |
| 17 | H |
| 18 | L |
| 19 | H |
| 20 | 4L |
| 21 | H |
| 22 | L |
| 23 | H |
| 24 | L |
M { 1,2,3 }
$C_1$ { 4 }
M { 5,6,7 }
$C_2$ { 8 }
M { 9,10,11 }
$C_3$ { 12 }
M { 13,14,15 }
$C_2$ { 16 }
M { 17,18,19 }
$C_1$ { 20 }
M { 21,22,23 }
T { 24 }
FIG. 32(b)
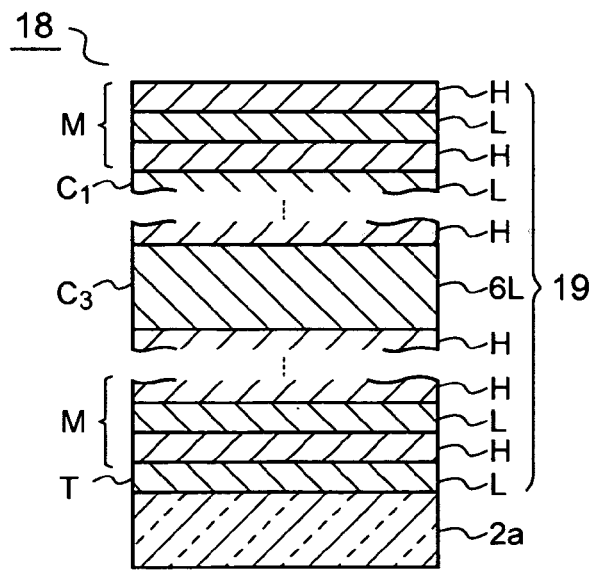

| | LAYER | THICKNESS (λ/4) | LAYER | THICKNESS (λ/4) | LAYER | THICKNESS (λ/4) |
|---|---|---|---|---|---|---|
| OUTSIDE MEDIUM | | AIR | | | | |
| M { | 1 | H | 25 | H | 49 | H |
|  | 2 | L | 26 | L | 50 | L |
|  | 3 | H | 27 | H | 51 | H |
| $C_1$ | 4 | 4L | 28 | 4L | 52 | 4L |
| M { | 5 | H | 29 | H | 53 | H |
|  | 6 | L | 30 | L | 54 | L |
|  | 7 | H | 31 | H | 55 | H |
| $C_2$ | 8 | 2L | 32 | 2L | 56 | 2L |
| M { | 9 | H | 33 | H | 57 | H |
|  | 10 | L | 34 | L | 58 | L |
|  | 11 | H | 35 | H | 59 | H |
| $C_3$ | 12 | 6L | 36 | 6L | 60 | 6L |
| M { | 13 | H | 37 | H | 61 | H |
|  | 14 | L | 38 | L | 62 | L |
|  | 15 | H | 39 | H | 63 | H |
| $C_2$ | 16 | 2L | 40 | 2L | 64 | 2L |
| M { | 17 | H | 41 | H | 65 | H |
|  | 18 | L | 42 | L | 66 | L |
|  | 19 | H | 43 | H | 67 | H |
| $C_1$ | 20 | 4L | 44 | 4L | 68 | 4L |
| M { | 21 | H | 45 | H | 69 | H |
|  | 22 | L | 46 | L | 70 | L |
|  | 23 | H | 47 | H | 71 | H |
| T | 24 | L | 48 | L | 74 | L |
| | | | | | SUBSTRATE 2a | GLASS |

FIG.35
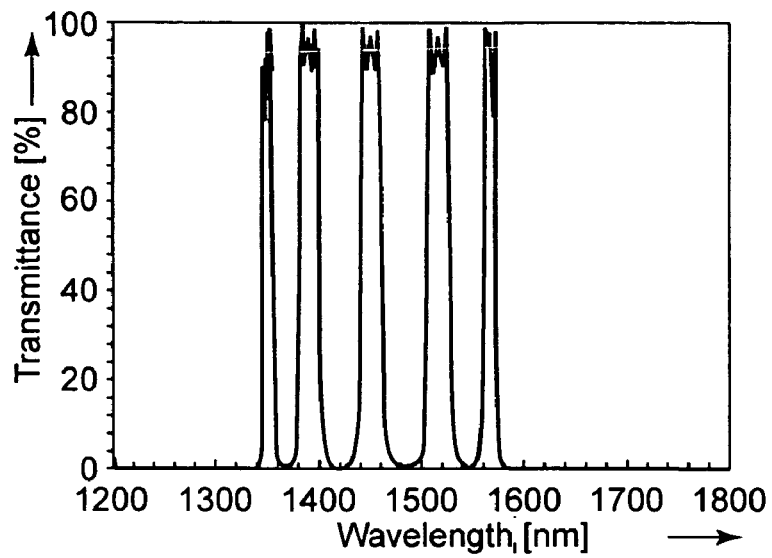
FIG. 36(a)
FIG. 36(b)
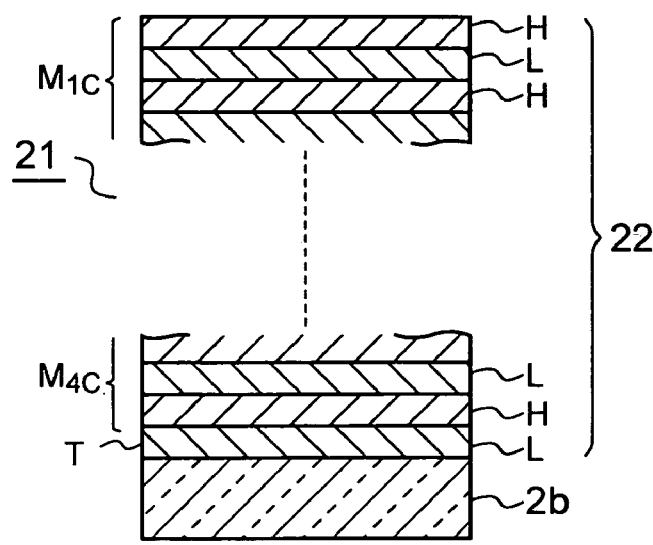

| LAYER | THICKNESS (λ/4) | LAYER | THICKNESS (λ/4) | LAYER | THICKNESS (λ/4) |
|---|---|---|---|---|---|
| OUTSIDE MEDIUM | AIR | | | | |
| 1 | H | 21 | H | 41 | H |
| 2 | L | 22 | L | 42 | L |
| 3 | H | 23 | H | 43 | H |
| 4 | L | 24 | L | 44 | L |
| 5 | H | 25 | H | 45 | H |
| 6 | 2L | 26 | 2L | 46 | 2L |
| 7 | H | 27 | H | 47 | H |
| 8 | L | 28 | L | 48 | L |
| 9 | H | 29 | H | 49 | H |
| 10 | 4L | 30 | 4L | 50 | 4L |
| 11 | H | 31 | H | 51 | H |
| 12 | 6L | 32 | 6L | 52 | 6L |
| 13 | H | 33 | H | 53 | H |
| 14 | L | 34 | L | 54 | L |
| 15 | H | 35 | H | 55 | H |
| 16 | L | 36 | L | 56 | L |
| 17 | H | 37 | H | 57 | H |
| 18 | L | 38 | L | 58 | L |
| 19 | H | 39 | H | 59 | H |
| 20 | L | 40 | L | 60 | L |
| | | | | SUBSTRATE 2b | BK7 |

Groupings on left: $M_{1C}$ = layers 1–5; $C_{1C}$ = layer 6; $M_{2C}$ = layers 7–9; $C_{2C}$ = layer 10; $M_{3C}$ = layer 11; $C_{3C}$ = layer 12; $M_{4C}$ = layers 13–19; T = layer 20.

MULTI-BANDPASS FILTER

CROSS-REFERENCE TO RELATED APPLICATIONS

This application is based upon and claims the benefits of priority from the prior Japanese Patent Application No. 2004-202695 filed on Jul. 9, 2004; the entire contents of which are incorporated herein by reference.

FIELD OF THE INVENTION

The present invention relates to a multi-bandpass filter having passbands in a plurality of wavelength regions.

BACKGROUND OF THE INVENTION

As is well known, necessary optical signals are effectively transmitted through a wavelength division multiplexing system in the optical fiber transmission system for the optical communication in which a plurality of lights having different wavelength regions are simultaneously transmitted via one optical fiber cable through an optical wavelength multiplexer that is a filter type bandpass filter using an interference filter utilizing effectively lights, and the lights are divided through an optical wavelength demultiplexer having the same structure as the optical multiplexer into the light of each wavelength region. However, it is necessary that multiplexing and demultiplexing should be carried out upon preparing a bandpass filter corresponding to the plurality of wavelength regions in order to ensure excellent transmission.

For example, as shown in FIG. 43, an optical wavelength demultiplexer 101 demultiplexing two wavelengths $\lambda_2$ and $\lambda_3$ out of the light including four wavelengths $\lambda_1$, $\lambda_2$, $\lambda_3$ and $\lambda_4$ has a structure in which four pieces of optical fibers 102 are provided on both opposite sides of a glass block 103 via a spacer 104 and a lens 105 respectively, and a first bandpass filter 106 and a second bandpass filter 107 corresponding to the wavelengths $\lambda_2$ and $\lambda_3$ to be demultiplexed respectively are provided between the spacer 104 on the predetermined position and the glass block 103. In the optical wavelength demultiplexer 101, the light of wavelength $\lambda_2$ is demultiplexed by the first bandpass filter portion 106 and the light of wavelength $\lambda_3$ is demultiplexed by the second bandpass filter portion 107 out of the light including four wavelengths $\lambda_1$, $\lambda_2$, $\lambda_3$, and $\lambda_4$ sent through one optical fiber 102, as the optical axis is designated by the dashed line and the direction of light transmission is designated by the arrow in the figure. The optical wavelength multiplexer has the same structure as the optical wavelength demultiplexer, but the direction of light transmission thereof is reverse to that of the demultiplexer.

Therefore, in the case that lights having a plurality of different wavelength regions are simultaneously transmitted via one optical fiber cable, it is required that bandpass filters corresponding to each wavelength region need not be prepared and moreover excellent transmission of light signals can be carried out. To the requirement mentioned above, a filter that transmits a plurality of lights having different wavelength regions, for example, a filter having two transmission bands and three rejection bands, which can transmit lights having two different wavelength regions, has been proposed (For example, refer to Japanese Patent Publication Hei5-26162). For the filter that can multiplex or demultiplex a plurality of lights having different wavelength regions, it is necessary that isolation between respective different wavelength regions should be sufficiently large and highly reliable because crosstalk would be generated and then the quality of communication would be deteriorated if isolation thereof is not sufficient.

On the other hand, for image pickup of color images for color TV etc., an object image is separated into blue, green and red lights. Then, blue, green and red image signals are obtained by devices provided corresponding to each color. A color separation prism and trimming filters for each color to separate the object image into blue, green and red colors are utilized. The trimming filter is used for perfect color separation because a dichroic film formed on the color separation prism cannot carry out color separation sufficiently by itself. For the trimming filter like this, a filter having a plurality of transmitting regions that can transmit e.g. blue, green and red wavelength regions but rejects the rest of wavelength regions has been developed (e.g. Japanese Patent Publication Shou60-38682 and Japanese Patent Publication Shou60-38683).

It is necessary that isolation between respective transmitting bands should be large enough even though one filter can transmit blue, green and red wavelength regions. Furthermore, it is required that even one filter can carry out color separation so that color separation and color reproduction with high fidelity can be accomplished.

The present invention is put into practice in the light of the circumstance mentioned above and intended to provide a highly reliable multi-bandpass filter having sufficient isolation between a plurality of transmission bands, which can separate surely a plurality of lights with different wavelength regions through one filter and carry out multiplexing and demultiplexing without decreasing the quality of communication in e.g. the wavelength multiplexing system of the optical communication. It is also intended to provide a filter concerning three primary colors in the image and color fields.

BRIEF SUMMARY OF THE INVENTION

The multi-bandpass filter in accordance with the present invention comprises a substrate transparent to an object light, and a thin film superimposed layer portion formed by mirror layers, cavity layers and a matching layer if necessary, comprising two kinds of dielectrics, both thereof being different from each other, superimposed on the substrate as one unit, an optical film thickness thereof being a quarter of a reference wavelength, to form a plurality of Fabry-Perrot interferometer structures, wherein the thin film superimposed layer portion has a structure represented by a fundamental formula of superimposition:

$$[M_0C_1M_1 \ldots C_iM_i(T)]^k \text{ or } [M_0C_1M_1 \ldots C_iM_i]^k,$$

where i and k are integers not less than 2), and films of the dielectrics are represented by X and Y; the mirror layers are represented by M; the cavity layers are represented by C; and the matching layer is represented by T, where M is a single layer, optical film thickness of films thereof being odd times of a quarter of the reference wavelength, or an alternating layer represented by [(2p+1)X, (2q+1)Y, ... ] of different dielectrics X and Y (where p, q, ... are zero or a positive integer respectively);

C is a single layer, optical film thickness of films thereof being even times of a quarter of the reference wavelength, or an alternating layer represented by [(2r)Y, (2s)X, ... ] of different dielectrics X and Y (where r, s, ... are zero or a positive integer respectively);

T is a single layer, optical film thickness of films thereof being odd times of a quarter of the reference wavelength.

The multi-bandpass filter is further characterized in that at least one of the dielectrics X and Y having the thickness of even times of a quarter of the reference wavelength is inserted alone or in plural into an arbitrary position of the structure represented by the fundamental formula.

The multi-bandpass filter is further characterized in that the thin film superimposed layer portion comprises matching layers on either the substrate side or a surface side or both sides in order to make alignment with an outside of the thin film superimposed layer portion. The outside of the thin film is usually air or an optical fiber.

The multi-bandpass filter is further characterized in that the matching layer for making alignment with the outside of the thin film superimposed layer portion comprises films of the dielectrics equal to the number of the fundamental block of the $[M_0C_1M_1 \ldots C_iM_i(T)]$ or more.

The multi-bandpass filter is further characterized in that the reference wavelength is 1450 nm; i being 2; and k being not less than 2.

The multi-bandpass filter is further characterized in that a part of the dielectric X or a part of the dielectric Y constituting the mirror layer M and the cavity layer C is replaced by a third dielectric different from the dielectrics X and Y, or a part of the dielectric X or a part of the dielectric Y in the mirror layer M or the cavity layer C is replaced by the third dielectric and a fourth dielectric different from the dielectrics X and Y for constructing the thin film superimposed layer portion.

The multi-bandpass filter in accordance with the present invention further comprises a substrate transparent to an object light and a thin film superimposed layer portion formed by mirror layers, cavity layers and a matching layer, comprising two kinds of dielectrics, both thereof being different from each other, superimposed on the substrate as one unit, an optical film thickness thereof being a quarter of a reference wavelength, to form a plurality of Fairy-Parrot interferometer structures, wherein the reference wavelength corresponds to a visible light, and the thin film superimposed layer portion is represented by $$[M_0(2eY)M_1(2fY)M_2(2gY)M_3(Y)]^k,$$

or $[M_4(2eY)(2fX)(2gY)M_5(Y)]^k,$ or $[M_6(2eY)M_7(2fX)M_8(2gY)M_9(X)]^k,$ when the films of the dielectrics are represented by X and Y, and the mirror layers are represented by M, where $M_0$ to $M_5$ being one of X, XYX, XYXYX, XYXYXYX; $M_6$, $M_8$ being one of YX, YXYX, YXYXYX; and $M_7$, $M_9$ being one of XY, XYXY, XYXYXY; e, f, and g being integers not less than 1; k being an integer not less than 2; and central wavelengths of three peaks of a transmittance characteristic curve formed being equal to wavelengths of three primary colors i.e. blue, green and red respectively.

The multi-bandpass filter in accordance with the present invention further comprises;

a substrate transparent to an object light and a thin film superimposed layer portion comprising a higher refractive index film of a dielectric having an optical film thickness (532/4) nm and a lower refractive index film of a dielectric having the optical film thickness (532/4) nm, both the films being superimposed alternately, wherein the thin film superimposed layer portion is represented by $$[X(2Y)X(2Y)X(2Y)X(Y)]^k$$

when one of the higher refractive index film and the lower refractive index film is represented by X and the other thereof is represented by Y, where k is an integer not less than 2.

The multi-bandpass filter is further characterized in that the higher refractive index film is X; the lower refractive index film is Y; and k is 6.

The multi-bandpass filter is further characterized in that the higher refractive index film is X; the lower refractive index film is Y; and k is 6.

The multi-bandpass filter is further characterized in that the higher refractive index film is formed by one of $TiO_2$, $Ta_2O_5$, $ZrO_2$, $Nb_2O_5$, $Al_2O_3$, and the lower refractive index film is formed by $SiO_2$.

As is clearly understood by the explanation mentioned above, the present invention can assure that the isolation between a plurality of the transmission bands can be sufficiently large and separation of lights in a plurality of different wavelength regions can be carried out through a single multi-bandpass filter. Thus the present invention provides high reliability for e.g. the wavelength multiplexing system of the optical communication, which can carry out multiplexing and demultiplexing without deterioration of the quality of communication. Furthermore, the present invention is effective for optics relating to imaging such as displays and digital cameras, and coloring of such as photography and cameras because it can provide a multi-bandpass filter transmitting simultaneously three primary colors; blue, green and red.

BRIEF DESCRIPTION OF THE DRAWINGS

FIG. 2 is a diagram explaining utilization form concerning an embodiment of the present invention, wherein

FIG. 26 is a diagram showing the film structure of the fourth embodiment of the present invention;

FIG. 27 is a diagram showing the transmittance characteristic of the fourth embodiment of the present invention;

FIG. 28 is a diagram showing the fundamental structure concerning the fifth embodiment of the present invention, wherein FIG. 28(a) is a diagram showing the film structure and FIG. 28(b) is a cross-sectional view thereof;

FIG. 31 is a diagram showing the transmittance characteristic of the fifth embodiment of the present invention;

FIG. 32 is a diagram showing the fundamental structure concerning the sixth embodiment of the present invention, wherein FIG. 32(a) is a diagram showing the film structure and FIG. 32(b) is a cross-sectional view thereof;

FIG. 35 is a diagram showing the transmittance characteristic of the sixth embodiment of the present invention;

FIG. 36 is a diagram showing the fundamental structure concerning the seventh embodiment of the present invention, wherein FIG. 36(a) is a diagram showing the film structure and FIG. 36(b) is a cross-sectional view thereof;

DETAILED DESCRIPTION OF THE INVENTION

Figure 1:
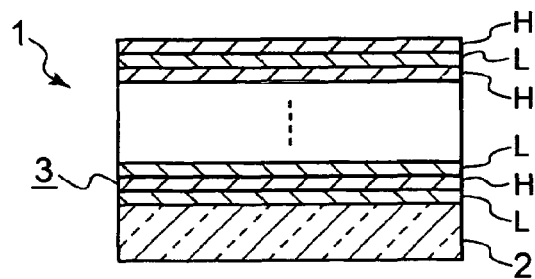
FIG. 1 is a schematic cross-sectional view of an embodiment of the present invention.

Several embodiments of the present invention will be hereinafter explained referring to the drawings accompanied. As shown in, for example, FIG. 1 that shows a schematic cross-sectional view, a multi-bandpass filter 1 of the present invention is a dielectric multi-layered filter comprising a substrate 2 transparent to the object light ranging from the infrared to the ultraviolet and a thin film layered portion 3 superimposed on the substrate 3, forming a plurality of Fabry-Perrot (FP) interferometers which have mirror portions, cavity portions and a matching portion if necessary. These portions comprise two kinds or more of dielectrics with different refractive indices and different materials, superimposed as a unit by the optical film thickness equal to a quarter of the reference wavelength. The substrate 2 is chosen depending on the purpose thereof from white board glass of alkali-less glass or borosilicate glass, fused quartz or quartz crystal composed mainly of silicon dioxide, optical glass such as BK7 (trade name), WMS-13 (trade name), WMS-15 (trade name), sapphire, $LiNbO_3$, $CaF_2$, silicon, semiconductor substrate, synthetic resin, and a glass fiber edge surface.

For the higher refractive index film H and the lower refractive index film L of the thin film layered portion 3 formed on the substrate 2, at least two kinds of materials are chosen from $TiO_2$, $Y_2O_3$, $Ta_2O_5$, ZrO, $ZrO_2$, Si, ZnS, $HfO_2$, Ge, $Nd_2O_6$, $Nb_2O_5$, $CeO_2$, ZnO, $FeO_3$, $SiO_2$, $MgF_2$, $AlF_3$, $CaF_2$, LiF, $Na_3AlF_6$, $Na_5Al_3F_{14}$, $Al_2O_3$, $CeF_3$, MgO, $LaF_3$, $PbF_2$, $NdF_3$, or any mixtures thereof. The chosen materials here are then filmed and superimposed alternately by a predetermined thickness by means of any one of vacuum deposition, sputtering, or PVD method of ion plating (physical vapor phase epitaxy), e.g. resistance-heating deposition, electron beam (EB) heating deposition, radio frequency (RF) heating deposition, laser beam heating deposition, ionized sputter, ion beam sputter, plasma sputter, ion assist method, or radically assist sputter.

The structure of alternately superimposed layer of dielectric films of the thin film layered portion 3 is as follows.

That is, in the dielectric film, the thickness of each optical film is $\lambda/4$ when the selected reference wavelength in the wavelength region containing the object light is $\lambda$. When each dielectric film is X or Y; the mirror layers are M; the cavity layers are C; and the matching layer is T, the fundamental formula of relationship among these superimposed layers is $$[M_0 C_1 M_1 \ldots C_i M_i(T)]^k$$

or $$[M_0 C_1 M_1 \ldots C_i M_i]^k$$

where i and k are integers not less than 2, and M, C, and T have following structures:

M is a single layer having a film whose optical film thickness is equal to odd times of a quarter of the reference wavelength, or alternate layers of different dielectrics X and Y represented by odd times of [(2p+1)X, (2q+1)Y, . . . ] (where p, q, . . . are 0 or positive integers)
(e.g. X, Y, XYX, YX, 3XYX5Y, . . . etc.)

C is a single layer having a film whose optical film thickness is equal to even times of a quarter of the reference wavelength, or alternate layers of different dielectrics X and Y represented by even times of [(2r)Y, (2s)X, . . . ] (where r, s, . . . are 0 or positive integers)
(e.g. 2X, 2Y, 2X4Y, 2Y2X2Y, . . . etc.)

T is a single layer having a film whose optical film thickness is equal to odd times of a quarter of the reference wavelength, (This layer is to regulate the phase between neighboring fundamental blocks (unitary fundamental formula construction), and necessary as the regulating layer if the beginning layer of $M_0$ and the ending layer of $M_i$ are the same material.).

Such layered portions may be modified from above basic structure where a single or a plurality of at least one of the dielectrics X and Y having the thickness of even times of a quarter of the reference wavelength is (are) interposed at an arbitrary position of the structure of the fundamental formula.

In the fundamental formula $[M_0C_1M_1C_2M_2 \ldots M^{(i-1)}C_iM_i(T)]^k$ of superimposition relationship among the abovementioned mirror layer M, cavity layer C, and matching layer T, repetition of a plurality of FP interferometer structures is included. If $i \geq 2$, then the mirror layers M are 3 or more; the cavity layers C are 2 or more. The fundamental block (the part in the parentheses [ ] of the fundamental formula) has two or more of FP interferometer structures where the mirror layer $M_1$ is shared by both FP interferometers of $M_0C_1M_1$ and $M_1C_2M_2$.

In the structure of the alternately superimposed layer of dielectric films represented by the fundamental formula mentioned above, both the mirror layer M and the cavity layer C may include several layers. When they are located adjacent to each other, the dielectric of the most outer layer in the mirror layer M should be different from that of most outer layer in the cavity layer C, and vice versa. For the mirror layers $M_0$ and $M_i$, one positioned at the beginning and the other at the ending of the fundamental block, if they have the same dielectric layer in the most outer side, the neighboring same layers themselves become the layer having a thickness of even times of X or Y thereof if repetition is executed as it is. To avoid above formation of unnecessary cavity, a single matching layer T having a thickness of odd times of X or Y is inserted in such a case.

Number of the cavity layers C in the fundamental block is just equal to number of peaks in the transmittance characteristic curve. Because the reference wavelength is the central wavelength of the multi-bandpass filter, a peak is generated at the central wavelength in the transmittance characteristic curve if number of the cavity layers C is odd, and a bottom is generated if the number is even.

Additionally, because the spectrum form of the multi-bandpass filter becomes symmetrical when the horizontal axis represents frequency (actually, strictly speaking, it is a little asymmetrical due to wavelength dispersion of the refractive indices of the materials), the band of the peak in the longer wavelength side of the center is wider and the peak in the shorter wavelength side is narrower when the horizontal axis represents wavelength. If the thickness of the cavity layer C is doubled, the full width at half maximum (FWHM) of the transmission peak becomes narrow and the distance between peaks also becomes narrower. The larger the number of layers of the mirror layers M, the narrower the FWHM of the transmission peak becomes. In addition, the more the number of repetition of the fundamental block, the greater the isolation between the transmission region and the rejection region in the middle of peaks. In accordance, the multi-bandpass filter suitable for the purpose can be obtained upon setting the above factors appropriately.

If each thickness of the mirror layer M and the cavity layer C solely except for the matching layer T in the fundamental block is picked up as a row of number, the peak transmittance of the fundamental block becomes the highest when the row of number is symmetrical.

For example, if $M_0=(XYX)$, $M_1=(XYXYX)$, $M_2=(XYX)$, $C_1=C_2=(2Y)$, and $T=Y$ for $[M_0C_1M_1C_2M_2(T)]$, then the row of number is [1112111112111] and the peak transmittance becomes the highest.

For example, if $M_0=M_2=(XY)$, $M_1=(YXYX)$, $C_1=(4X)$, and $C_2=(4Y)$ for $[M_0C_1M_1C_2M_2]$, then the row of number is [1141111411] and the peak transmittance becomes the highest.

The thickness of the dielectrics X and Y to be inserted is restricted to be even times. If it is inserted into the mirror layer M, the number of peak does not change as the number of the cavity layer C does not change, but the position and the FWHM of the peak change slightly. When it is inserted around the cavity layer C, the number of the peak can be increased.

For example, if (2Y) is inserted into (XYX), it becomes (X3YX) and number of the peak is not changed.

For example, either one of (2X) or (2Y) is inserted at the center of (X2Y2XY), it becomes (X2Y4XY) or (X4Y2XY) and the number of the cavity layer C does not change. However (2X) and (2Y) are simultaneously inserted, it becomes (X2Y2X2Y2XY). When insertion is carried out in all cavity layers C, the number of the peak increases.

In the case that a part of the cavity layer C, the mirror layer M and the matching layer T of the fundamental block is exchanged with a third dielectric and a fourth dielectric different from the dielectrics X and Y, the number of peaks does not change but the position and the FWHM of peak are changed.

Figures 2A, 2B:
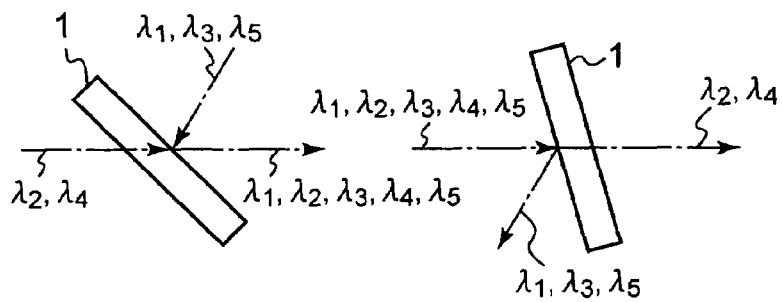
FIG. 2(a) is a diagram showing a multi-bandpass filter for multiplexing and FIG. 2(b) is a diagram showing a multi-bandpass filter for demultiplexing.

If the multi-bandpass filter 1 thus constructed, which passes lights of two distant wavelength regions (lights of wavelengths $\lambda_2$ and $\lambda_4$) through the thin film superimposed layer 3 of e.g. i=2 for the fundamental formula, has a two-peak characteristic having two transmission bands, and multiplexing and demultiplexing as shown in FIG. 2 can be carried out by the multi-bandpass filter 1. That is to say, the lights of wavelengths $\lambda_2$ and $\lambda_4$ are incident at a predetermined incident angle e.g. 0 to 30 degrees on the surface of the multi-bandpass filter 1, and also the lights of wavelength $\lambda_1$, $\lambda_3$ and $\lambda_5$ are incident thereon at a predetermined incident angle from the back side as shown in FIG. 2(a), and thereby multiplexed lights of the wavelengths $\lambda_1$, $\lambda_2$, $\lambda_3$, $\lambda_4$ and $\lambda_5$ can be obtained. When the lights of the wavelengths $\lambda_1$, $\lambda_2$, $\lambda_3$, $\lambda_4$ and $\lambda_5$ are incident on the surface of the multi-bandpass filter 1 at a predetermined angle as shown in FIG. 2(b), the lights of wavelengths $\lambda_2$ and $\lambda_4$ pass through in the same direction as the above and the lights of wavelengths $\lambda_1$, $\lambda_3$ and $\lambda_5$ are reflected in the other direction thereof, and thereby demultiplexing is carried out.

Several embodiments of the multi-bandpass filter comprising a thin film superimposed layer portion having the abovementioned structure will be hereinafter explained referring to the drawings.

Figure 3:
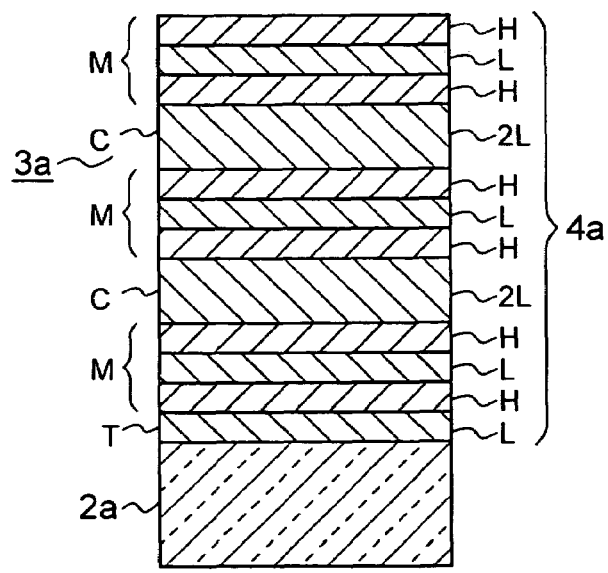
FIG. 3 is a cross-sectional view showing the fundamental structure concerning the first embodiment of the present invention.
Figure 4:
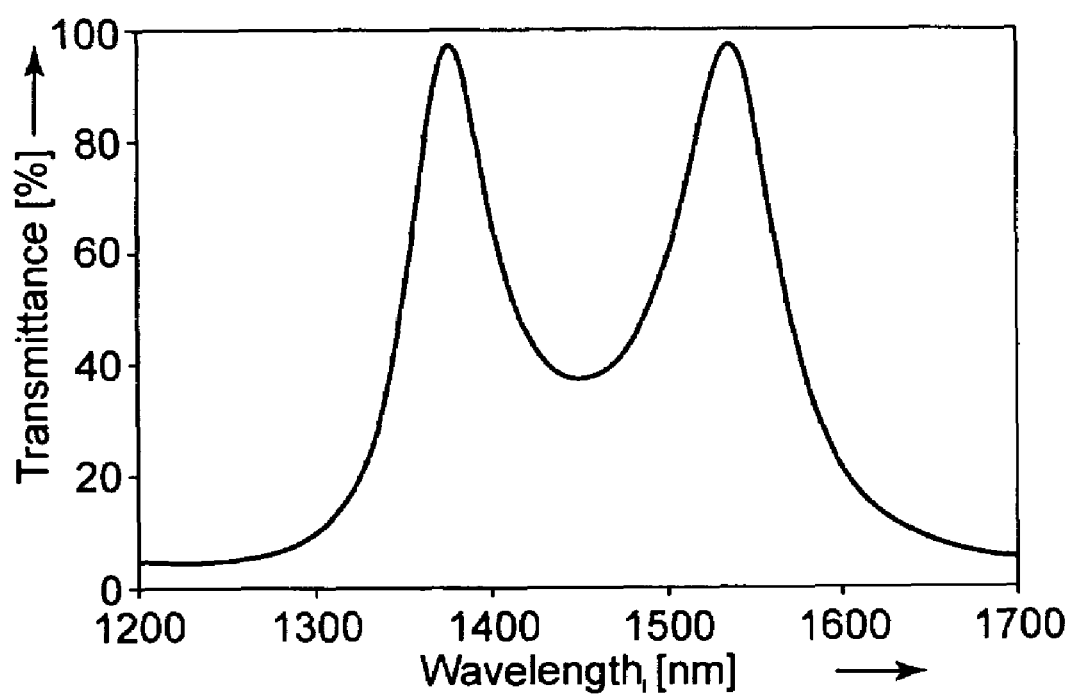
FIG. 4 is a diagram showing the transmittance characteristic of the fundamental structure for the first embodiment of the present invention.
Figure 5:
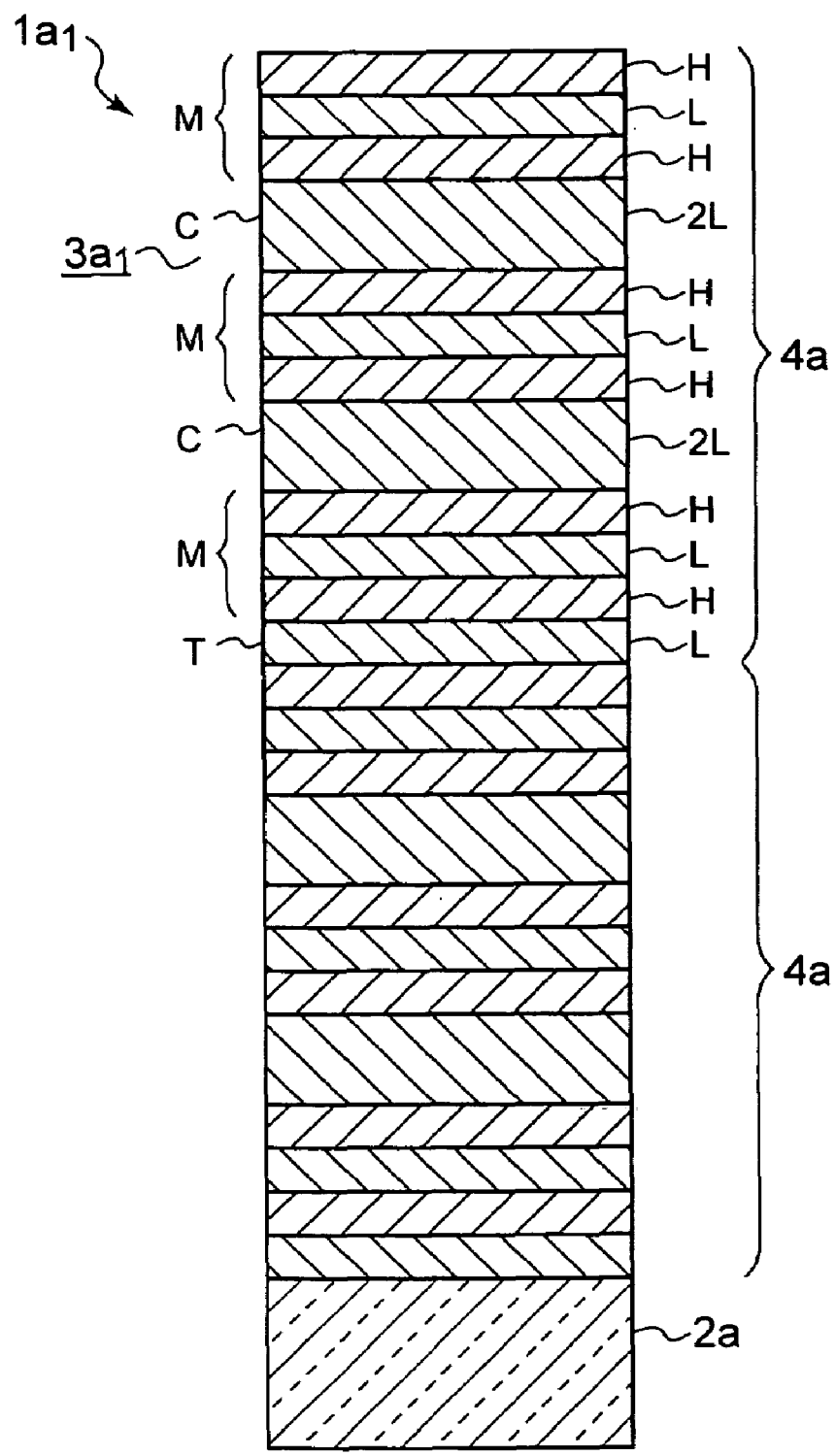
FIG. 5 is a cross-sectional view showing the first practical example for the first embodiment of the present invention.
Figure 6:
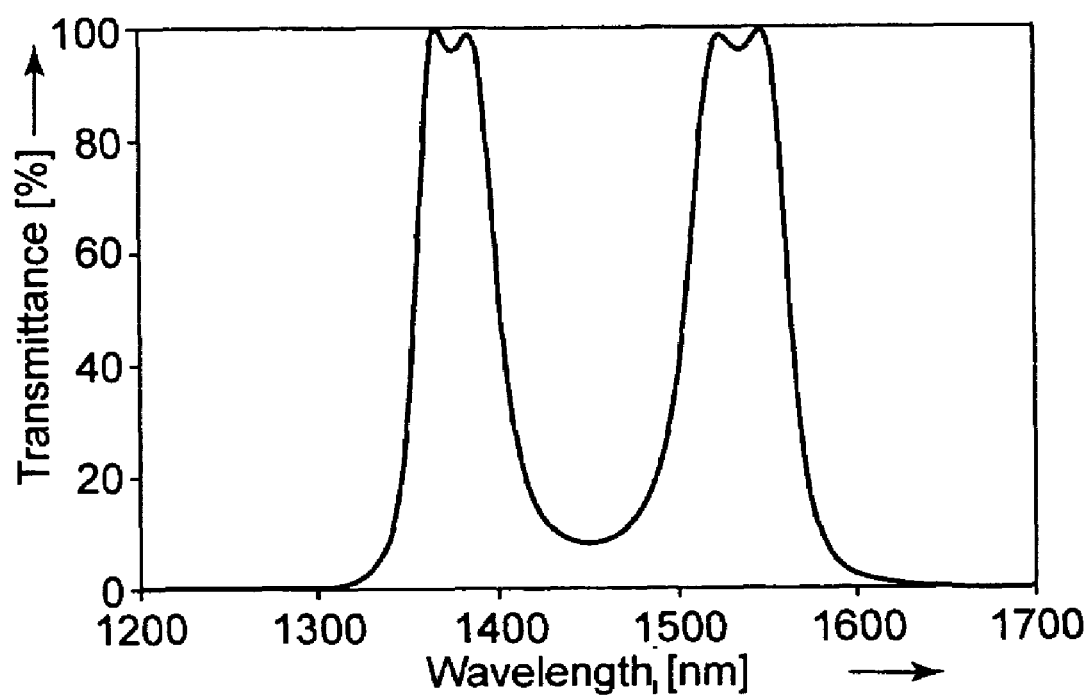
FIG. 6 is a diagram showing the transmittance characteristic of the first practical example for the first embodiment of the present invention.
Figure 7:
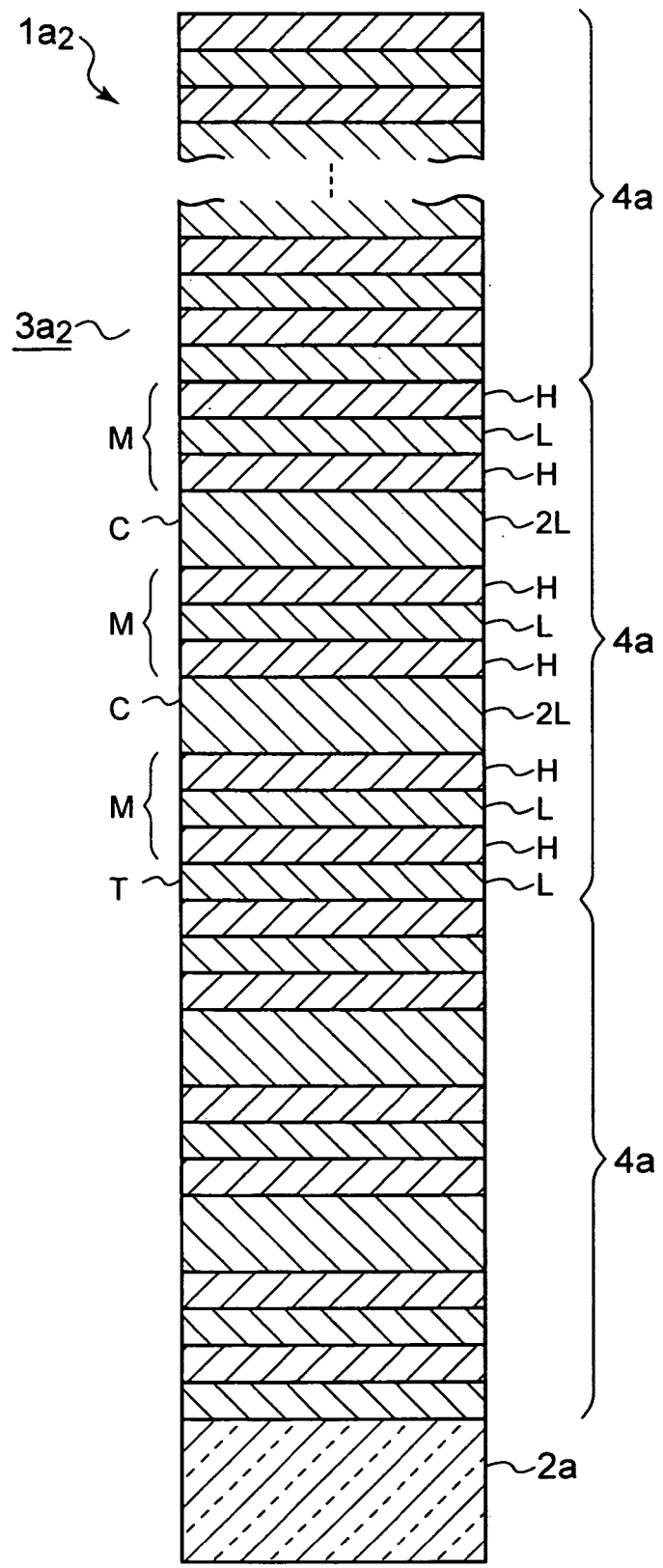
FIG. 7 is a cross-sectional view showing the second practical example for the first embodiment of the present invention.
Figure 8:
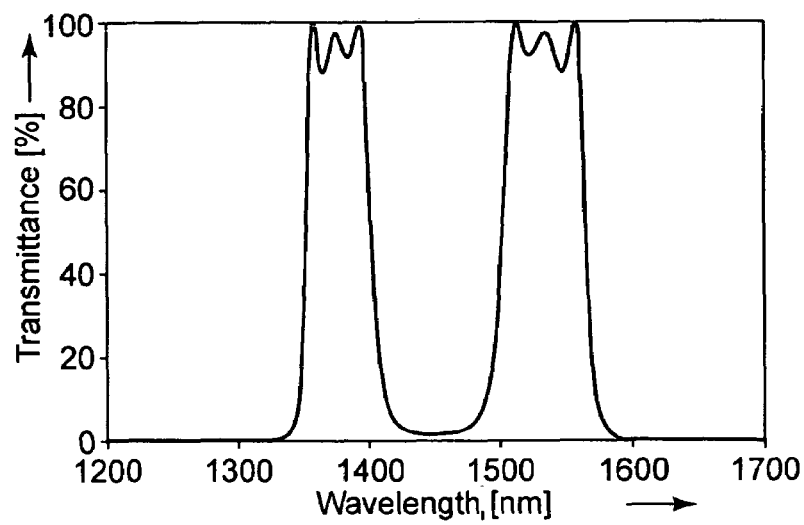
FIG. 8 is a diagram showing the transmittance characteristic of the second practical example for the first embodiment of the present invention.
Figure 9:
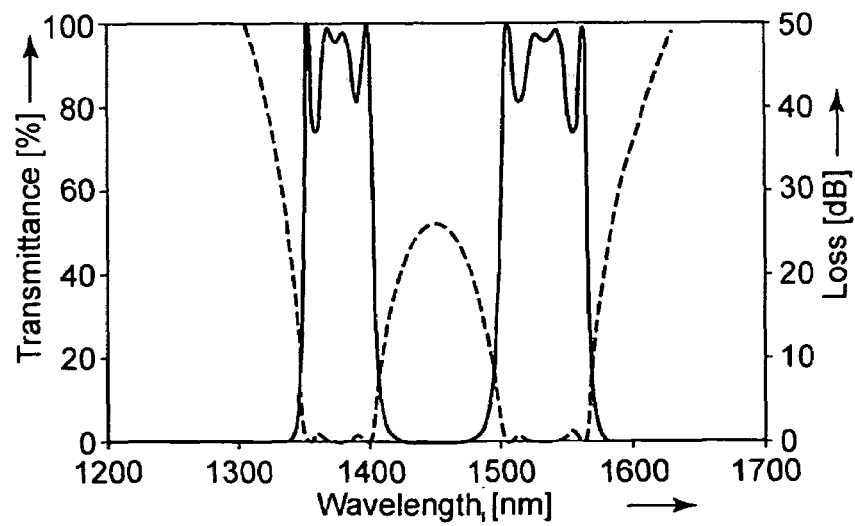
FIG. 9 is a diagram showing the transmittance characteristic of the third practical example for the first embodiment of the present invention.
Figure 10:
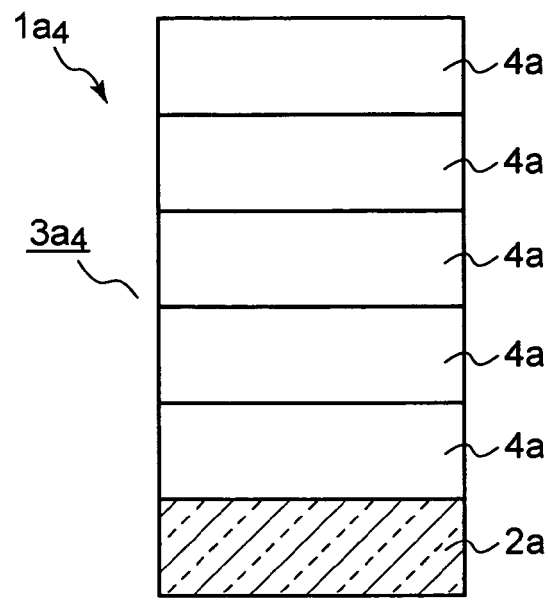
FIG. 10 is a cross-sectional view showing the fourth practical example for the first embodiment of the present invention.
Figure 11:
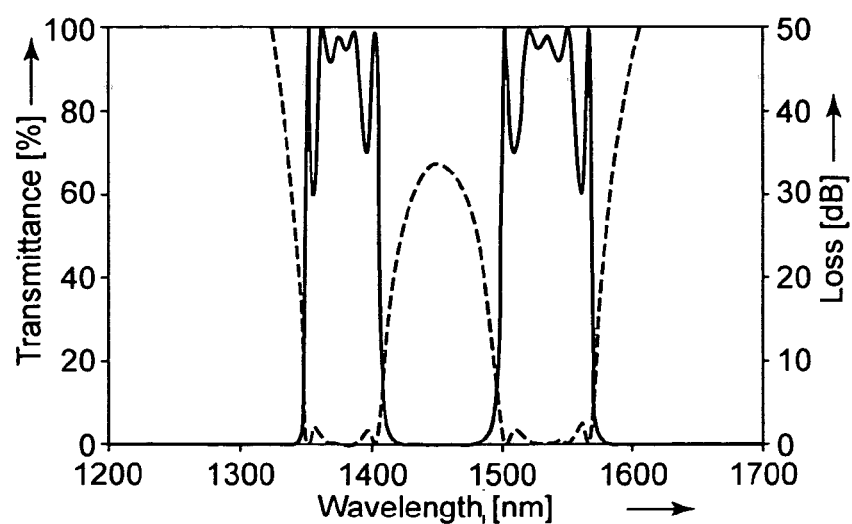
FIG. 11 is a diagram showing the transmittance characteristic of the fourth practical example for the first embodiment of the present invention.
Figure 12:
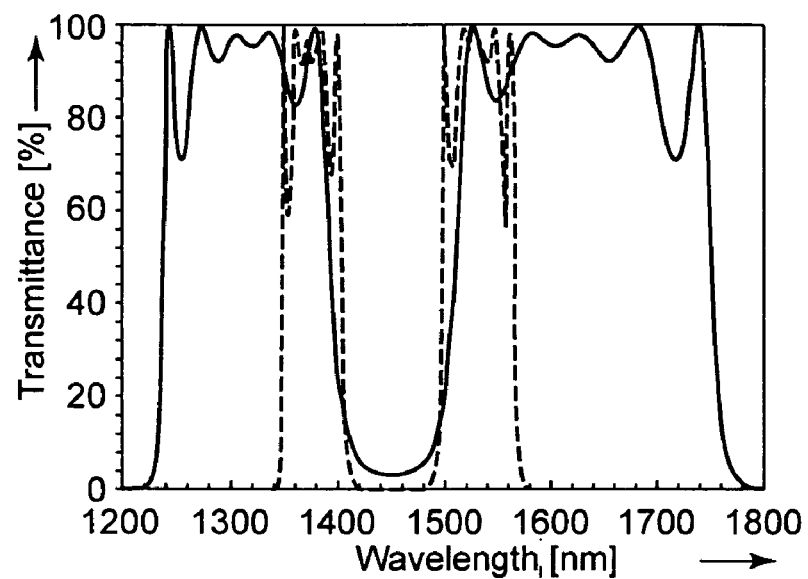
FIG. 12 is a diagram showing the transmittance characteristic of the first variation form for the first embodiment of the present invention.
Figure 13:
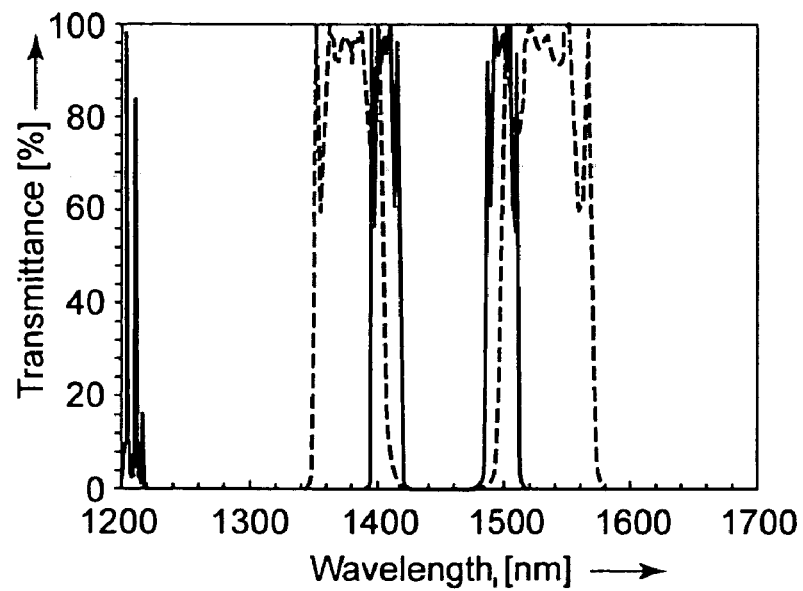
FIG. 13 is a diagram showing the transmittance characteristic of the second variation form for the first embodiment of the present invention.
Figure 14:
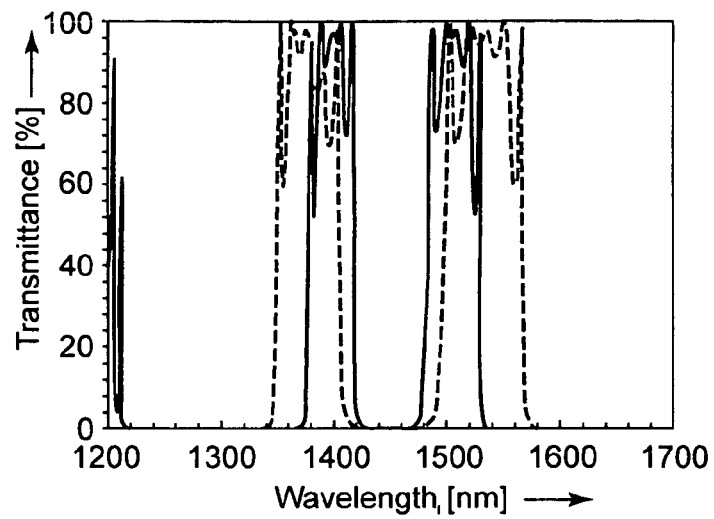
FIG. 14 is a diagram showing the transmittance characteristic of the third variation form for the first embodiment of the present invention.

First of all, the first embodiment will be not explained using FIG. 3 to FIG. 14. FIG. 3 is a cross-sectional view showing the fundamental structure; FIG. 4 is a diagram showing the transmittance characteristics for the fundamental structure; FIG. 5 is a cross-sectional view showing the first practical example; FIG. 6 is a diagram showing the transmittance characteristics for the first practical example; FIG. 7 is a cross-sectional view showing the second practical example; FIG. 8 is a diagram showing the transmittance characteristics for the second practical example; FIG. 9 is a diagram showing the transmittance characteristics for the third practical example; FIG. 10 is a cross-sectional view showing the fourth practical example; FIG. 11 is a diagram showing the transmittance characteristics for the fourth practical example; FIG. 12 is a diagram showing the transmittance characteristics for the first variation form; FIG. 13 is a diagram showing the transmittance characteristics for the second variation form; and FIG. 14 is a diagram showing the transmittance characteristics for the third variation form.

This embodiment is that the abovementioned fundamental formula $[M_0C_1M_1 \ldots C_iM_i(T)]^k$ is represented as $[M(CM)^iT]^k$ because all M and C thereof are the same ($M_0 = M_1 = \ldots = M_i, C_1 = \ldots = C_i$) disrespectively, based on the one having the fundamental structure and the transmittance characteristic shown in FIG. 3 and FIG. 4 respectively when i=2, having two transmitting bands. The fundamental structure thereof is formed as follows.

In FIG. 3 and FIG. 4, 2a is a substrate formed by glass with the refractive index n=1.52, and a thin film superimposed portion 3a is provided on the upper surface thereof. The thin film superimposed portion 3a comprises higher refractive index films H of the dielectric material $TiO_2$ having the refractive index n of 2.22 and the optical film thickness of a quarter of the reference wavelength λ=1450 nm and lower refractive index films L of the dielectric material $SiO_2$ having the refractive index n of 1.44 and the optical film thickness of a quarter of the reference wavelength λ=1450 nm. The higher refractive index film H and the lower refractive index film L are superimposed alternately and form a film structure, which has H and L for X and Y respectively in the fundamental formula as shown in FIG. 3.

The thin film superimposed layer portion 3a has a structure in which the mirror layer M having the higher refractive index film H and the lower refractive index film L superimposed alternately as H, L, H, and the cavity layer C of lower refractive index film L with the optical film thickness (2×λ/4) interposed between the mirror layers M represented by 2L are positioned. Furthermore, the structure has the single-layered matching layer T of lower refractive index film L on the side of the substrate 2a after the combination of the cavity layer C and the mirror layer M is repeated twice, so as to construct one fundamental block 4a. The fundamental block 4a is represented by

[M(CM)²T]¹ (where M=H, L, H, C=2L, T=L)

The transmittance characteristic thereof becomes the two-peak characteristic in which the transmittance is low at the reference wavelength λ=1450 nm and has transmitting regions having higher transmittance at both sides thereof as shown in FIG. 4.

Each example mentioned below in this embodiment has the fundamental blocks 4a provided repeatedly on the substrate 2a.

Referring to FIG. 5 and FIG. 6, the first practical example of this embodiment will be explained. The multi-bandpass filter $1a_1$ has the structure where the thin film superimposed layer portion $3a_1$ is provided with the abovementioned fundamental blocks 4a repeated twice on the substrate 2a, and represented by

[M(CM)²T]² (where M=H, L, H, C=2L, T=L).

The transmittance characteristic thereof is low at the reference wavelength λ and has transmitting regions having higher transmittance at both sides thereof as shown in FIG. 6. The wavelength region of higher transmittance is sufficiently separated from the wavelength region of lower transmittance with respect to the transmittance, so that isolation between the transmitting band and the rejecting band is large. The multi-bandpass filter $1a_1$ has transmitting bands at two wavelength regions of approximately 1380 nm and 1540 nm.

Referring to FIG. 7 and FIG. 8, the second practical example of this embodiment will be explained. The multi-bandpass filter $1a_2$ has the structure where the thin film superimposed layer portion $3a_2$ is provided with the abovementioned fundamental blocks 4a repeated three times on the substrate 2a, and represented by

[M(CM)²T]³ (where M=H, L, H, C=2L, T=L).

The transmittance characteristic thereof is low i.e. several percent at the reference wavelength λ and has transmitting regions having higher transmittance at both sides thereof like the first practical example as shown in FIG. 8. The wavelength region of higher transmittance is more sufficiently separated than that of the first practical example from the wavelength region of lower transmittance with respect to the transmittance, so that isolation between the transmitting band and the rejecting band becomes larger. Thus the multi-bandpass filter $1a_2$ has transmitting bands at two wavelength regions of approximately 1380 nm and 1540 nm.

Referring to FIG. 9, the third practical example of this embodiment will be explained. The multi-bandpass filter $1a_3$ (not shown) has the structure where the thin film superimposed layer portion $3a_3$ (not shown) is provided with the abovementioned fundamental blocks 4a repeated four times on the substrate 2a, and represented by

[M(CM)²T]⁴ (where M=H, L, H, C=2L, T=L).

The transmittance characteristic thereof is approximately zero percent at the reference wavelength λ and has two transmitting regions having higher transmittance at both sides thereof like the first practical example as shown by the solid line in FIG. 9. As shown by the dotted line in FIG. 9, the insertion loss thereof has the difference of 26 dB between the high transmitting region and the interposed low transmitting region. The wavelength region of higher transmittance is further sufficiently separated than that of the second practical example from the wavelength region of lower transmittance with respect to the transmittance, so that isolation between the transmitting band and the rejecting band becomes large enough. Thus the multi-bandpass filter $1a_3$ has transmitting bands at two wavelength regions of approximately 1380 nm and 1540 nm.

Referring to FIG. 10 and FIG. 11, the fourth practical example of this embodiment will be explained. The multi-bandpass filter $1a_4$ has the structure where the thin film superimposed layer portion $3a_4$ is provided with the abovementioned fundamental blocks $4a$ repeated five times on the substrate $2a$, and represented by $$[M(CM)^2T]^5 \text{ (where M=H, L, H, C=2L, T=L).}$$

The transmittance characteristic thereof is low i.e. about zero percent at the reference wavelength λ and has two transmitting regions having higher transmittance at both sides thereof like the first practical example as shown by the solid line in FIG. 11. As shown by the dotted line in FIG. 11, the insertion loss thereof has the difference of 34 dB between the high transmitting region and the low transmitting region in the middle of the peaks. As repeating times of the fundamental block $4a$ increase like the above, separation of the wavelength region of higher transmittance from the wavelength region of lower transmittance get improved, and becomes greater than that of the third practical example with respect to the transmittance, so that isolation between the transmitting band and rejecting band becomes large enough. Thus the multi-bandpass filter $1a_4$ has transmitting bands at two wavelength regions of approximately 1380 nm and 1540 nm.

The first variation form of this embodiment will be explained next. FIG. 12 is a diagram showing the transmittance characteristic of this variation form. The multi-bandpass filter $1b$ (not shown) of this variation form has the structure where the thin film superimposed layer portion $3b$ (not shown) is provided with the fundamental block $4b$ described next, which is repeated five times on the substrate $2a$. Namely, the fundamental block $4b$ comprises the mirror layer M including solely one layer with the optical film thickness λ/4 of the higher refractive index film H of the dielectric material $TiO_2$ with the refractive index n=2.22 but not including the lower refractive index film L, the cavity layer C including the lower refractive index film L with the optical film thickness (2×λ/4) represented by 2L of the dielectric material $SiO_2$ with the refractive index n=1.44, and further the single-layered matching layer T with the optical film thickness λ/4, comprising the lower refractive index film L of the same material as the cavity layer C on the substrate $2a$ side. The structure of the thin film superimposed layer portion $3b$ is represented by $$[M(CM)^2T]^5 \text{ (where M=H, C=2L, T=L).}$$

The transmittance characteristic thereof is low i.e. several percent at the reference wavelength λ, and then a filter of two-peak characteristic with two transmitting regions having higher transmittance wider than the fourth practical example at both sides thereof as shown by the solid line in FIG. 12 can be provided. The dotted line in FIG. 12 represents the transmittance characteristic of the fourth practical example.

The second variation form of this embodiment will be explained next. FIG. 13 is a diagram showing the transmittance characteristic of this variation form. The multi-bandpass filter $1c$ (not shown) of this variation form has the structure where the thin film superimposed layer portion $3c$ (not shown) is provided with the abovementioned fundamental blocks $4c$ repeated five times on the substrate $2a$. Namely, the fundamental block $4c$ has the structure comprising the mirror layer M in which the higher refractive index film H and the lower refractive index film L of the optical film thickness λ/4 as the examples mentioned above are superimposed alternately like H, L, H, L, H, and the cavity layer C represented by 2L, of the lower refractive index film L of the optical film thickness (2×λ/4), positioned between the mirror layers M. The structure further has the matching layer T of a single-layered lower refractive index film L on the side of the substrate $2a$ after the combination of the cavity layer C and the mirror layer M is positioned repeatedly twice, and is represented by $$[M(CM)^2T]^5 \text{ (where M=H, L, H, L, H, C=2L, T=L).}$$

The transmittance characteristic thereof is low i.e. about zero percent at the reference wavelength λ, and then a filter of two-peak characteristic having two transmitting regions of approximately 1400 nm and 1500 nm with higher transmittance band width narrower than that of the fourth embodiment at both sides thereof as shown by the solid line in FIG. 13 can be provided. The dotted line in FIG. 13 represents the transmittance characteristic of the fourth practical example.

The third variation form of this embodiment will be explained below. FIG. 14 is a diagram showing the transmittance characteristic of this variation form. The multi-bandpass filter $1d$ (not shown) of this variation form has the structure where the thin film superimposed layer portion $3d$ (not shown) is provided with the abovementioned fundamental blocks $4d$ repeated five times on the substrate $2a$ like the fourth practical example. Namely, the fundamental block $4d$ has the structure comprising the mirror layer M in which the higher refractive index film H and the lower refractive index film L of the optical film thickness λ/4 equivalent to those of each example mentioned above are superimposed alternately like H, L, H, and the cavity layer C represented by 4L, of the lower refractive index film L of the optical film thickness (4×λ/4) being twice of the fourth practical example, positioned between the mirror layers M. The structure further has the matching layer T of a single-layered lower refractive index film L on the side of the substrate $2a$ after the combination of the cavity layer C and the mirror layer M is positioned repeatedly twice, and is represented by $$[M(CM)^2T]^5 \text{ (where M=H, L, H, L, H, C=4L, T=L).}$$

The transmittance characteristic thereof is low i.e. about zero percent at the reference wavelength λ, and then a filter of two-peak characteristic having two transmitting regions of approximately 1400 nm and 1500 nm with higher transmittance band width slightly narrower than that of the fourth practical example at both sides thereof as shown by the solid line in FIG. 14 can be provided. The dotted line in FIG. 14 represents the transmittance characteristic of the fourth practical example.

Figure 15:
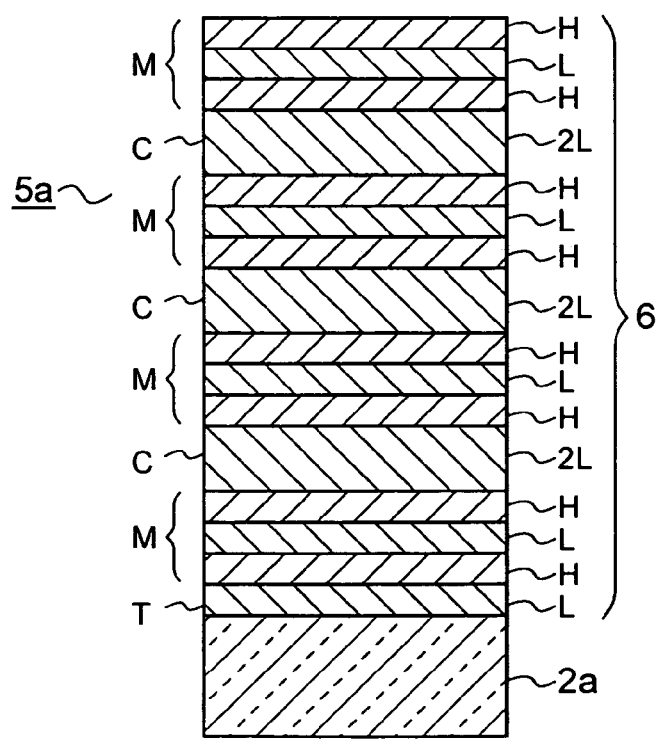
FIG. 15 is a cross-sectional view showing the fundamental structure concerning the second embodiment of the present invention.
Figure 16:
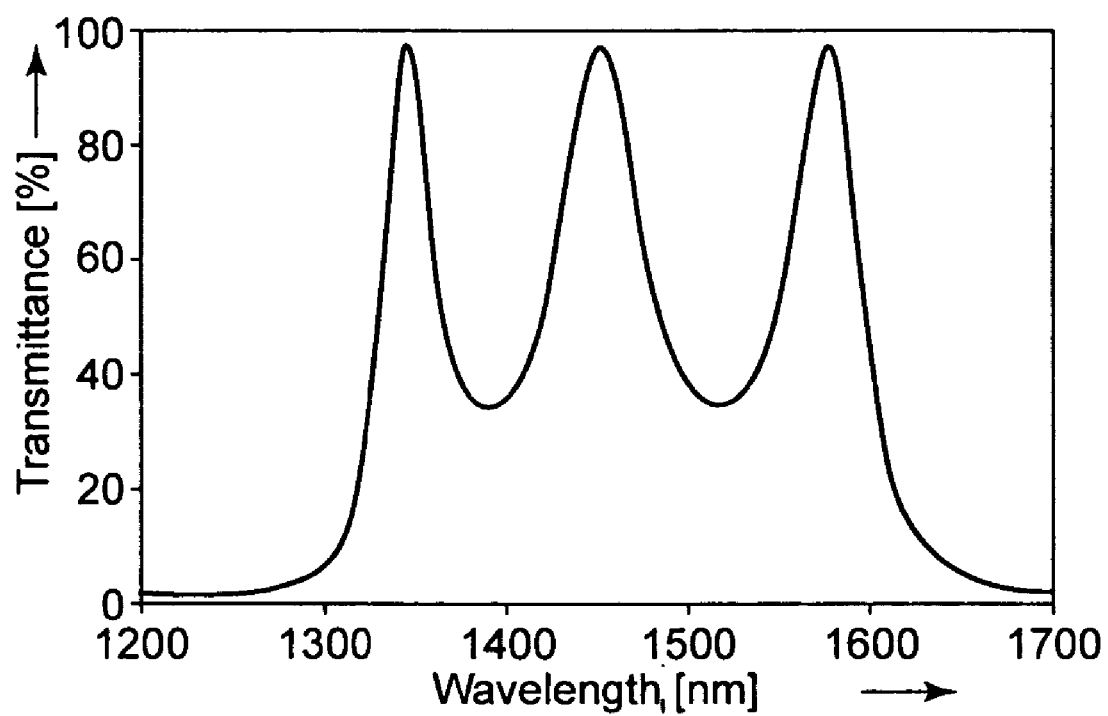
FIG. 16 is a diagram showing the transmittance characteristic of the fundamental structure for the second embodiment of the present invention.
Figure 17:
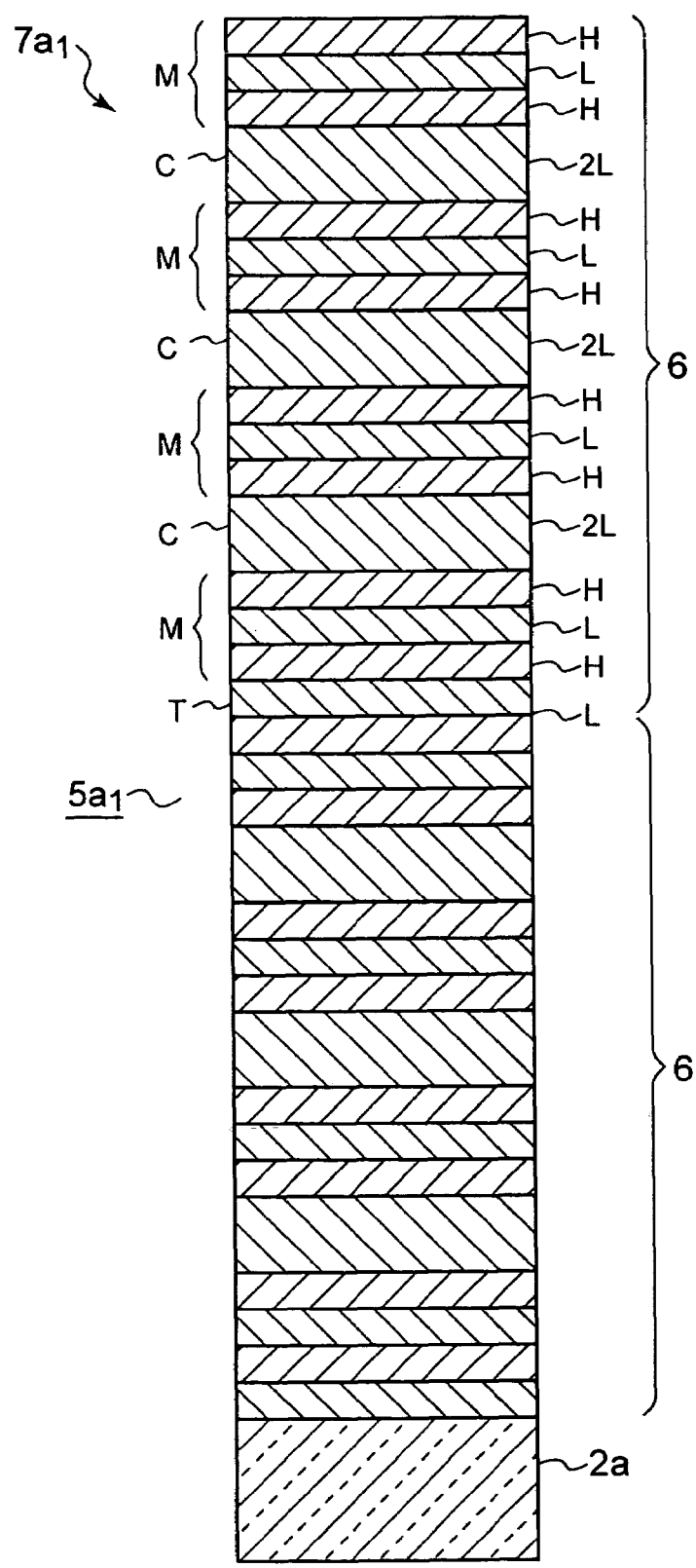
FIG. 17 is a cross-sectional view showing the first practical example for the second embodiment of the present invention.
Figure 18:
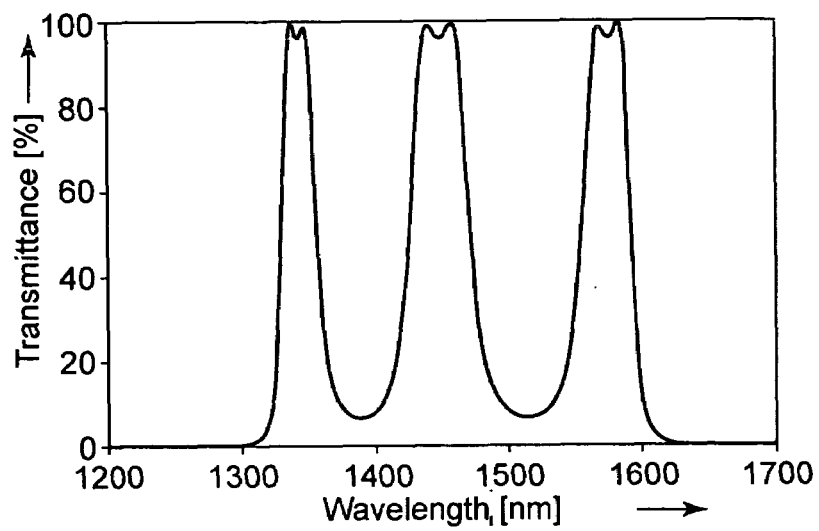
FIG. 18 is a diagram showing the transmittance characteristic of the first practical example for the second embodiment of the present invention.
Figure 19:
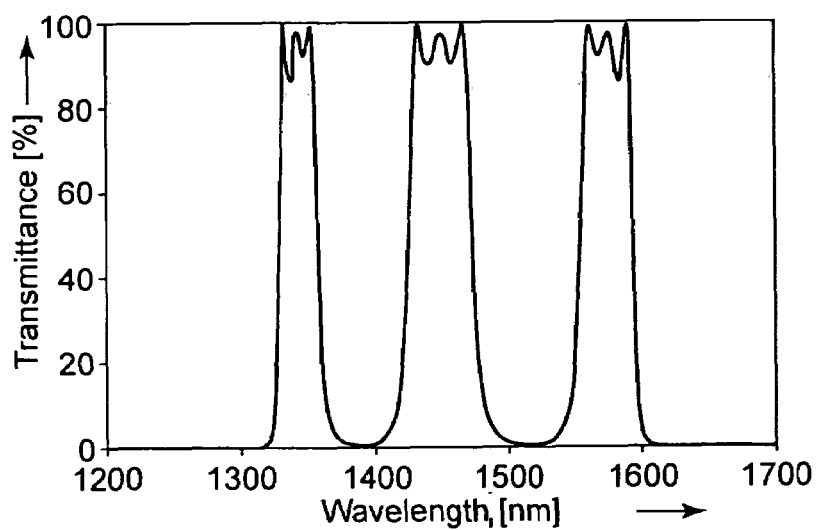
FIG. 19 is a diagram showing the transmittance characteristic of the second practical example for the second embodiment of the present invention.
Figure 20:
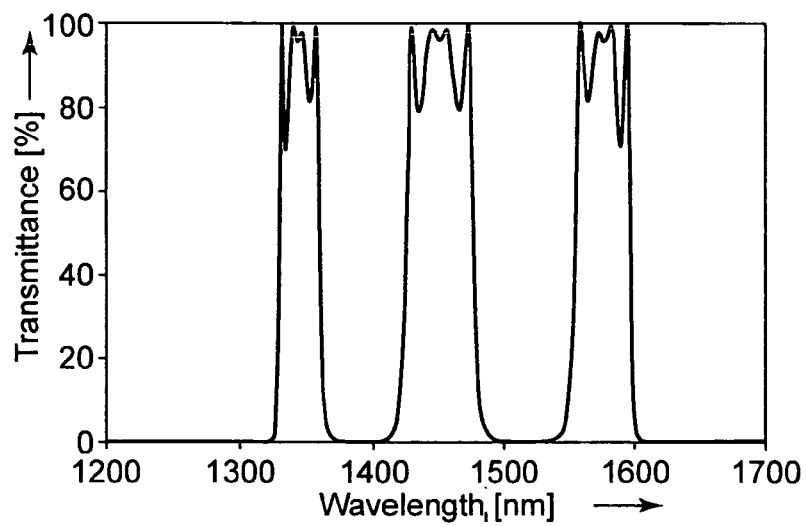
FIG. 20 is a diagram showing the transmittance characteristic of the third practical example for the second embodiment of the present invention.
Figure 21:
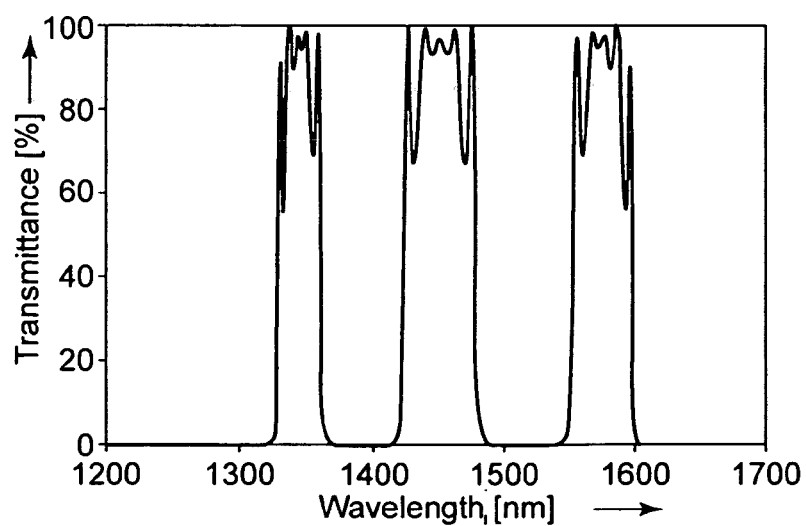
FIG. 21 is a diagram showing the transmittance characteristic of the fourth practical example for the second embodiment of the present invention.

The second embodiment will be explained referring to FIG. 15 to FIG. 21. FIG. 15 is a cross-sectional view showing the fundamental structure; FIG. 16 is a diagram showing the transmittance characteristics for the fundamental structure; FIG. 17 is a cross-sectional view showing the first practical example; FIG. 18 is a diagram showing the transmittance characteristics for the first practical example; FIG. 19 is a cross-sectional view showing the second practical example; FIG. 20 is a diagram showing the transmittance characteristics for the third practical example; and FIG. 21 is a diagram showing the transmittance characteristics for the fourth practical example.

This embodiment is that the fundamental formula $[M_0C_1M_1 \ldots C_iM_i(T)]^k$ is represented as $[M(CM)^iT]^k$ because all M and C thereof are respectively the same i.e. ($M_0=M_1=\ldots=M_i$, $C_1=\ldots=C_i$) like the fist embodiment mentioned above. The embodiment is based on the one having the fundamental structure and the transmittance characteristic shown in FIG. 15 and FIG. 16 respectively in the case of i=3, having three transmitting bands. The fundamental structure is formed as follows.

In FIG. 15 and FIG. 16, 2a is a substrate formed by glass with the refractive index n=1.52, and a thin film superimposed portion 5a is provided on the upper surface thereof. The thin film superimposed portion 5a comprises the higher refractive index films H of the dielectric material $TiO_2$ having the refractive index n=2.22 and the optical film thickness of a quarter of the reference wavelength λ=1450 nm and the lower refractive index films L of the dielectric material $SiO_2$ having the refractive index n=1.44 and the optical film thickness of a quarter of the reference wavelength λ=1450 nm. The higher refractive index film H and the lower refractive index film L are superimposed alternately and form together a film structure, which has H and L for X and Y respectively in the fundamental formula, as shown in FIG. 15.

The thin film superimposed layer portion 5a has the structure in which the mirror layer M having the higher refractive index film H and the lower refractive index film L superimposed alternately as H, L, H, and the cavity layer C of the lower refractive index film L with the optical film thickness (2×λ/4) interposed between the mirror layers M represented by 2L are positioned. Furthermore, the structure has the single-layered matching layer T of the lower refractive index film L on the side of the substrate 2a after the combination of the cavity layer C and the mirror layer M is repeated three times, in order to construct one fundamental block 6. The fundamental block 6 is represented by $[M(CM)^3T]^1$ (where M=H, L, H, C=2L, T=L)

The transmittance characteristic thereof is the three-peak characteristic where the transmitting regions of higher transmittance are provided at the reference wavelength λ=1450 nm and both sides as shown in FIG. 16. Four rejected regions are also formed, with two in the middle of the peaks, and two in the external sides.

Each example mentioned below in this embodiment has the fundamental block 6 provided repeatedly on the substrate 2a.

Referring to FIG. 17 and FIG. 18, the first practical example of this embodiment will be explained. The multi-bandpass filter $7a_1$ has the structure where the thin film superimposed layer portion $5a_1$ is provided with the abovementioned fundamental blocks 6 repeated twice on the substrate 2a, and represented by $[M(CM)^3T]^2$ (where M=H, L, H, C=2L, T=L).

The transmittance characteristic thereof is the three-peak characteristic where the transmitting regions of higher transmittance, which are interposed by two low transmitting regions, are provided at the reference wavelength λ and both sides, and the three transmitting bands of higher transmittance are spaced together at an approximately equal distance as shown in FIG. 18. The three wavelength regions of higher transmittance are sufficiently separated from the wavelength regions of lower transmittance, so that isolation between the transmitting band and the rejecting band is large. The multi-bandpass filter $7a_1$ of this practical example has transmitting bands at three wavelength regions of approximately 1340 nm, 1450 nm and 1580 nm.

Referring to FIG. 19, the second practical example of this embodiment will be explained. The multi-bandpass filter $7a_2$ (not shown) has the structure where the thin film superimposed layer portion $5a_2$ (not shown) is provided with the abovementioned fundamental blocks 6 repeated three times on the substrate 2a, and represented by $[M(CM)^3T]^3$ (where M=H, L, H, C=2L, T=L).

The transmittance characteristic thereof is the three-peak characteristic where the transmitting regions of higher transmittance, which are interposed by two low transmitting regions with the transmittance of several percent, are provided at the reference wavelength λ and both sides, and the three transmitting bands of higher transmittance are spaced together at an approximately equal distance like the first practical example as shown in FIG. 19. The three wavelength regions of higher transmittance are further sufficiently separated than the first practical example from the wavelength region of lower transmittance, so that isolation between the transmitting band and the rejecting band is large. The multi-bandpass filter $7a_1$ of this practical example has transmitting bands at three wavelength regions of approximately 1340 nm, 1450 nm and 1580 nm.

Referring to FIG. 20, the third practical example of this embodiment will be explained. The multi-bandpass filter $7a_3$ (not shown) has the structure where the thin film superimposed layer portion $5a_3$ (not shown) is provided with the abovementioned fundamental blocks 6 repeated four times on the substrate 2a, and represented by $[M(CM)^3T]^4$ (where M=H, L, H, C=2L, T=L).

The transmittance characteristic thereof is the three-peak characteristic where the transmitting regions of higher transmittance, which are interposed by two low transmitting regions, are provided at the reference wavelength λ and both sides, and the three higher transmitting regions are spaced together at an approximately equal distance like the first practical example as shown in FIG. 20. The three wavelength regions of higher transmittance are further sufficiently separated than the second practical example from the wavelength region of lower transmittance, so that isolation between the transmitting band and the rejecting band is large. The multi-bandpass filter of this practical example has transmitting bands at three wavelength regions of approximately 1340 nm, 1450 nm and 1580 nm.

Referring to FIG. 21, the fourth practical example of this embodiment will be explained. The multi-bandpass filter $7a_4$ (not shown) has the structure where the thin film superimposed layer portion $5a_4$ (not shown) is provided with the abovementioned fundamental blocks 6 repeated five times on the substrate 2a, and represented by $[M(CM)^3T]^5$ (where M=H, L, H, C=2L, T=L).

The transmittance characteristic thereof is the three-peak characteristic where the transmitting regions of higher transmittance, which are interposed by two low transmitting regions of the transmittance of about zero percent, are provided at the reference wavelength λ and both sides thereof, and the three transmitting bands of higher transmittance are spaced together at an approximately equal distance like the first practical example as shown in FIG. 21. The three wavelength regions of higher transmittance are more separated than the third practical example from the wavelength region of lower transmittance because separability can be improved as repeating times of the fundamental block 6 get increased, so that isolation between the transmitting band and the rejecting band becomes sufficiently large. The multi-bandpass filter of this practical example has transmitting bands at three wavelength regions of approximately 1340 nm, 1450 nm and 1580 nm.

Figure 22:
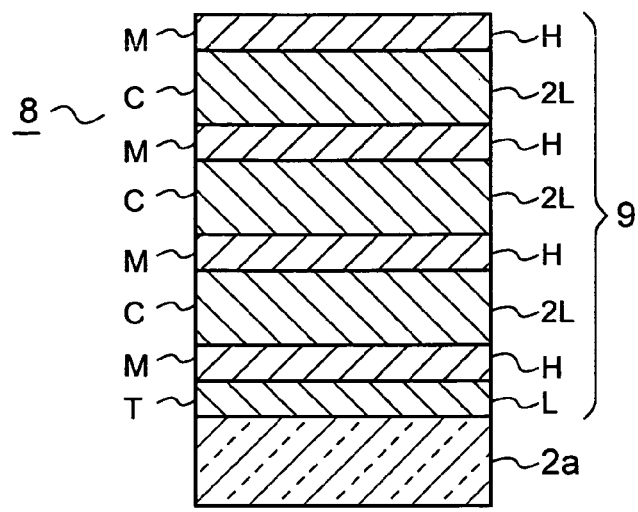
FIG. 22 is a cross-sectional view showing the fundamental structure concerning the third embodiment of the present invention.
Figure 23:
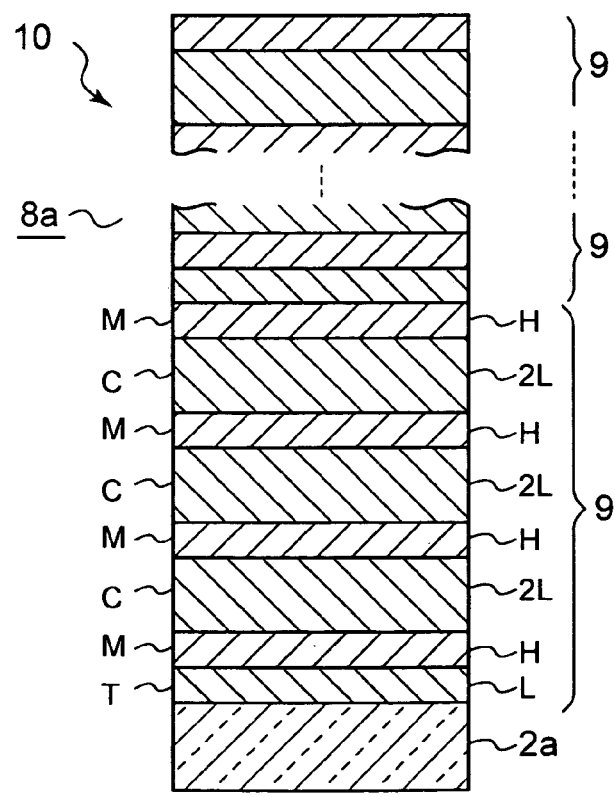
FIG. 23 is a cross-sectional view showing the third embodiment of the present invention.
Figure 24:
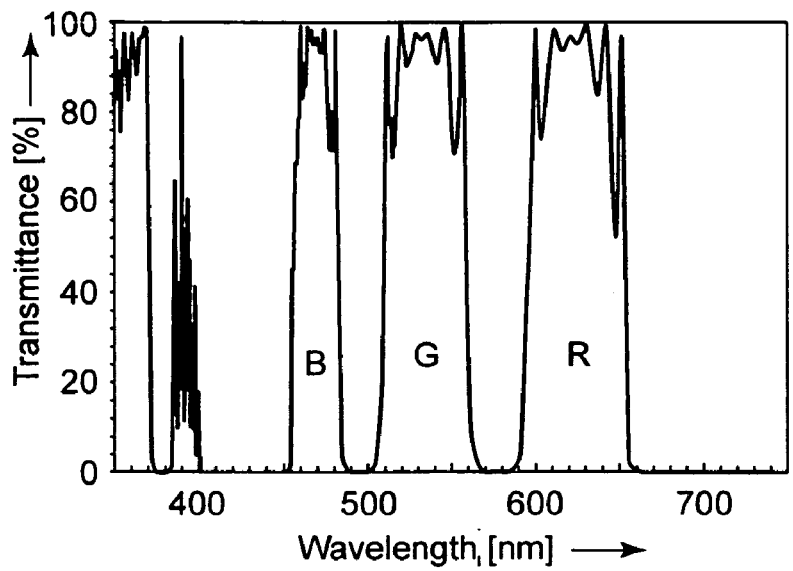
FIG. 24 is a diagram showing the transmittance characteristic of the third embodiment of the present invention.

Referring to FIG. 22 to FIG. 24, the multi-bandpass filter of the third embodiment, which transmits wavelength regions of blue, green and red, will be explained. FIG. 22 is a cross-sectional view showing the fundamental structure; FIG. 23 is a cross-sectional view of this embodiment; and FIG. 24 is a diagram showing the transmittance characteristic of this embodiment.

This embodiment is based on the fundamental structure as shown in FIG. 22 and has three transmitting bands. The fundamental structure thereof is constructed as follows.

In FIG. 22, mark 2a denotes the substrate of glass with the refractive index n=1.52, and the thin film superimposed layer portion 8 is provided thereon. The thin film superimposed layer portion 8 comprises the higher refractive index films H of the dielectric material $TiO_2$ having the refractive index n=2.22, optical film thickness thereof being a quarter of the reference wavelength $\lambda$=532 nm, and the lower refractive index films L of the dielectric material $SiO_2$ having the refractive index n=1.44, optical film thickness thereof being a quarter of the reference wavelength $\lambda$=532 nm. The higher refractive index film H and the lower refractive index film L are superimposed alternately and the film structure is formed as shown in FIG. 22, where X and Y in the fundamental formula are represented by H and L respectively.

The thin film superimposed layer portion 8 is comprised of the mirror layer M having only one layer of the higher refractive index film H of $\lambda/4$ in optical film thickness without the lower refractive index films L, the cavity layer C represented by 2L having the lower refractive index film L of $(2\times\lambda/4)$ in optical film thickness, and the matching layer T having single layer of the lower refractive index film L of $\lambda/4$ in optical film thickness. The thin film superimposed layer portion 8 constitutes one fundamental block 9. The fundamental block is represented by $[M(CM)^3T]^1$ (where M=H, C=2L, T=L), and the transmittance characteristic thereof is three peak characteristic which has transmitting bands of higher transmittance at the reference wavelength $\lambda$=532 nm and both sides thereof separated therefrom by lower transmittance bands. Moreover, the widths of the transmitting bands are broad because the mirror layer M is only one layer of the higher refractive index film Ha.

Based on such fundamental structure, the multi-bandpass filter 10 has the structure in which the abovementioned fundamental block 9 is repeated six times for the thin film superimposed layer portion 8a provided on the substrate 2a as shown in FIG. 23, and is represented by $[M(CM)^3T]^6$ (where M=H, C=2L, T=L).

The transmittance characteristic thereof has three transmitting bands with higher transmittance, which transmits green at the reference wavelength $\lambda$=532 nm, blue and red at both sides thereof (473 nm and 633 nm) separated therefrom by a lower transmittance band respectively. Each transmitting band is sufficiently separated from each other so that blue, green and red colors can be transmitted at the same time by a single filter with high separation to each other.

Figure 25:
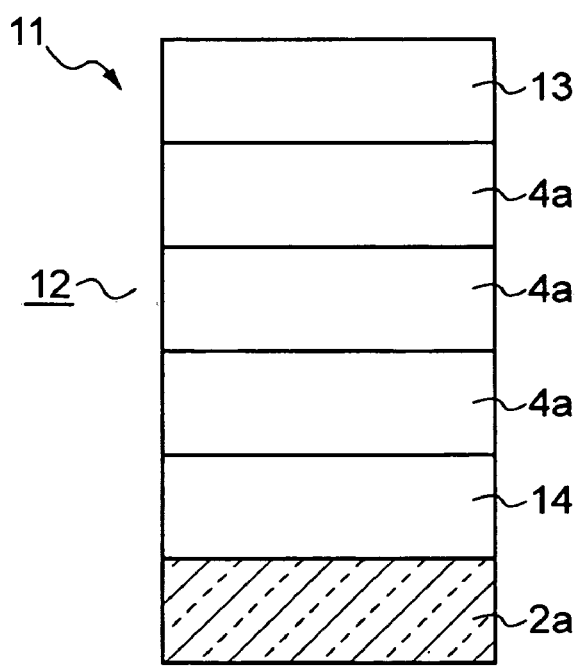
FIG. 25 is a cross-sectional view showing the fourth embodiment of the present invention.

The fourth embodiment will be explained referring to FIG. 25 to FIG. 27. FIG. 25 is a cross-sectional view of this embodiment; FIG. 26 is a diagram showing the film structure of this embodiment; and FIG. 27 is a diagram showing the transmittance characteristic of this embodiment. Because this embodiment has the same fundamental structure as that of the first embodiment, explanation will be carried out by referring to each drawing of the first embodiment at the same time.

In FIG. 25 and FIG. 26, the multi-bandpass filter 11 is provided with the thin film superimposed layer portion 12 comprising the higher refractive index film H of the dielectric material $TiO_2$ having the refractive index n=2.22 and the lower refractive index film L of the dielectric material $SiO_2$ having the refractive index n=1.44, both of which are superimposed alternately by 60 layers on the substrate 2a of glass with the refractive index n=1.52. Order of arrangement for the higher refractive index film H and the lower refractive index film L of the thin film superimposed layer portion 12 is approximately the same as the fourth practical example of the first embodiment, having a form represented by $[M(CM)^2T]^5$ (where M=H, L, H, C=2L, T=L), i.e. the fundamental block 4a is repeated five times.

However, in this embodiment, the fundamental structure of the 13th layer to the 48th layer constituting the main part of the thin film superimposed layer portion 12 is the same as the fundamental structure of the first embodiment. Namely, the higher refractive index film H and the lower refractive index film L, whose optical film thicknesses are both a quarter of the reference wavelength $\lambda$=1450 nm, are provided in order that the fundamental block 4a is repeated three times. The main part is represented by $[M(CM)^2T]^3$ (where M=H, L, H, C=2L, T=L).

The first layer to the 12th layer of the air side, which are on the surface side of the thin film superimposed layer portion 12 provided on the outside portion of the superimposing direction of the main part, and the 49th layer to the 60th layer on the substrate 2a side are to be the air side matching layer 13 and the substrate side matching layer 14 respectively. The higher refractive index film H and the lower refractive index film L of both the matching layers 13 and 14 are so formed that the film thicknesses thereof are different from those of the fundamental block 4a. That is to say, as shown in FIG. 26, the optical film thicknesses thereof are properly compensated in reference to the optical film thickness of a quarter of the reference wavelength $\lambda$=1450 nm.

Upon compensating properly the film thicknesses of the higher refractive index film H and the lower refractive index film L of both the matching layers 13 and 14 as mentioned above so as to be optimized, two transmitting bands of the transmittance characteristic thereof can be surely separated and isolation between the transmitting band and the rejecting band becomes sufficiently large as shown in FIG. 27. Besides, the transmitting characteristics at the wavelength region from 1350 nm to 1400 nm and the wavelength region from 1510 nm to 1560 nm in each transmitting band can be flatter than the transmittance characteristic of the fourth practical example of the first embodiment shown in FIG. 11. Though the film thicknesses of every 12 layers on the air side and the substrate side of the fundamental structure portion were compensated to be the proper values in this embodiment, number of layers to be compensated is not restricted thereto. In addition, number of layers constituting the air side matching layer 13 and the substrate side matching layer 14 can be properly set, and the compensating value thereof can also be suitably set, if necessary.

Figures 29, 30:
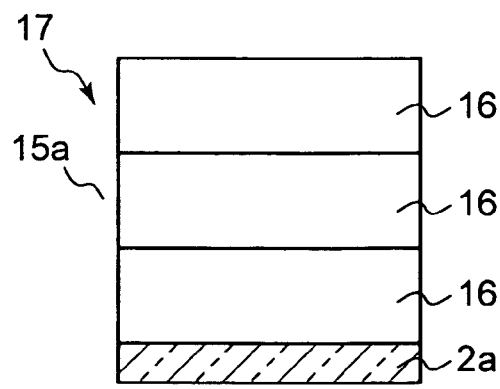
FIG. 29 is a diagram showing the film structure of the fifth embodiment of the present invention.
FIG. 30 is across-sectional view showing the fifth embodiment of the present invention.

The fifth embodiment will be explained referring to FIG. 28 to FIG. 31. FIG. 28 is a diagram showing the fundamental structure; FIG. 28(a) is a diagram showing the film structure;

FIG. 28(b) is a cross-sectional view; FIG. 29 is a diagram showing the film structure of this embodiment; FIG. 30 is a cross-sectional view of this embodiment; and FIG. 31 is a diagram showing the transmittance characteristic of this embodiment.

This embodiment corresponds to the case in which number of $(C_iM_i)$ is 5 for the abovementioned fundamental formula $[M_0(C_1M_1) \ldots (C_iM_i)T]^k$, and is represented by $[M_1(C_1M_2)(C_2M_3)(C_3M_3)(C_2M_2)(C_1M_1)T]^k$, where $M_1$, $M_2$, $M_3$, $C_1$, $C_2$ and $C_3$ are all different from each other. This embodiment is based on the fundamental structure shown by FIG. 28, having the mirror layers M and the cavity layers C symmetrically arranged with respect to $C_3$ and has five transmitting bands. The fundamental structure thereof is constituted as follows.

The thin film superimposed layer portion 15 formed on the substrate of glass with the refractive index n=1.52 in FIG. 28 has the higher refractive index film H of the dielectric material $TiO_2$ with the refractive index n=2.22 having the optical film thickness of a quarter of the reference wavelength λ=1450 nm and the lower refractive index film L of the dielectric material $SiO_2$ with the refractive index n=1.44 having the optical film thickness of a quarter of the reference wavelength λ=1450 nm. The higher refractive index film H and the lower refractive index film L are superimposed alternately, and the film structure is that X and Y of the fundamental formula are formed by H and L respectively.

The fundamental block 16 constituting the thin film superimposed layer portion 15 has the mirror layer $M_1$ alternately superimposed like H, L, H, L, H, the cavity layer $C_1$ represented by 4L, the mirror layer $M_2$ alternately superimposed like H, L, H, the cavity layer $C_2$ represented by 2L, the mirror layer $M_3$ of H only, the cavity layer $C_3$ represented by 6L, the mirror layer $M_3$ of H only, the cavity layer $C_2$ represented by 2L, the mirror layer $M_2$ alternately superimposed like H, L, H, the cavity layer $C_1$ represented by 4L, the mirror layer $M_1$ alternately superimposed like H, L, H, L, H, and the matching layer T of L, all of these layers being superimposed in the order mentioned above from the surface side (air side).

When the multi-bandpass filter 17 is formed, the thin film superimposed layer portion 15a formed by, for example, the fundamental blocks 16 repeated three times is provided on the substrate 2a as shown in FIG. 29 and FIG. 30.

The transmittance characteristic of the multi-bandpass filter 17 constituted like the above is the five-peak characteristic in which the transmitting regions of higher transmittance, which are interposed by four transmitting regions of the transmittance of about zero percent, are provided at the reference wavelength λ, both sides thereof and further external both sides thereof, and the five transmitting bands of higher transmittance are spaced together at uneven distances as shown in FIG. 31. The five wavelength regions of higher transmittance are sufficiently separated from those of lower transmittance. The multi-bandpass filter of this practical example has transmitting bands at five wavelength regions of approximately 1310 nm, 1390 nm, 1450 nm, 1520 nm and 1630 nm.

Figures 33, 34:
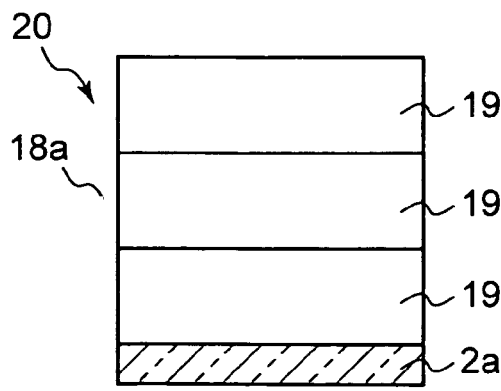
FIG. 33 is a diagram showing the film structure of the sixth embodiment of the present invention.
FIG. 34 is a cross-sectional view showing the sixth embodiment of the present invention.

The sixth embodiment will be explained next referring to FIG. 32 to FIG. 35. FIG. 32 is a diagram showing the fundamental structure; FIG. 32(a) is a diagram showing the film structure; FIG. 32(b) is a cross-sectional view; FIG. 33 is a diagram showing the film structure of this embodiment; FIG. 34 is a cross-sectional view of this embodiment; and FIG. 35 is a diagram showing the transmittance characteristic of this embodiment.

This embodiment corresponds to the case in which number of $(C_1M_1)$ to $(C_iM_i)$ is 5 for the abovementioned fundamental formula $[M_0(C_1M_1) \ldots (C_iM_i)T]^k$, and is represented by $[M(C_1M)(C_2M)(C_3M)(C_2M)(C_1M)T]^k$, where all M are the same but $C_1$, $C_2$, $C_3$ are all different from each other. This embodiment is based on the fundamental structure shown by FIG. 32, having the mirror layers M and the cavity layers C symmetrically arranged with respect to $C_3$ and has five transmitting bands. The fundamental structure thereof is constituted as follows.

The thin film superimposed layer portion 18 formed on the substrate 2a of glass with the refractive index n=1.52 in FIG. 32 has the higher refractive index film H of the dielectric material $TiO_2$ with the refractive index n=2.22 having the optical film thickness of a quarter of the reference wavelength λ=1450 nm and the lower refractive index film L of the dielectric material $SiO_2$ with the refractive index n=1.44 having the optical film thickness of a quarter of the reference wavelength λ=1450 nm. The higher refractive index film H and the lower refractive index film L are superimposed alternately, and the film structure thereof is that X and Y of the fundamental formula are formed by H and L respectively.

The thin film superimposed layer portion 18 including one fundamental block 19 has the mirror layer M alternately superimposed like H, L, H, the cavity layer $C_1$ represented by 4L, the mirror layer M alternately superimposed like H, L, H, the cavity layer $C_2$ represented by 2L, the mirror layer M alternately superimposed like H, L, H, the cavity layer $C_3$ represented by 6L, the mirror layer M alternately superimposed like H, L, H, the cavity layer $C_2$ represented by 2L, the mirror layer M alternately superimposed like H, L, H, the cavity layer $C_1$ represented by 4L, the mirror layer M alternately superimposed like H, L, H, and the matching layer T of L, all of these layers being superimposed in the order mentioned above from the surface side (air side).

When the multi-bandpass filter 20 is formed, the thin film superimposed layer portion 18a formed by, for example, the fundamental blocks 19 repeated three times is provided on the substrate 2a as shown in FIG. 33 and FIG. 34.

The transmittance characteristic of the multi-bandpass filter 20 constituted like the above is the five-peak characteristic where the transmitting regions of higher transmittance, which are interposed by four low transmitting regions of the transmittance of approximately zero percent, are provided at the reference wavelength λ, both sides thereof and further external both sides thereof, and the five transmitting bands of higher transmittance are spaced together at uneven distances as shown in FIG. 35. The five wavelength regions of higher transmittance are sufficiently separated from the wavelength regions of lower transmittance. The multi-bandpass filter of this practical example has transmitting bands at five wavelength regions of approximately 1350 nm, 1390 nm, 1450 nm, 1520 nm and 1570 nm.

Figures 37, 38:
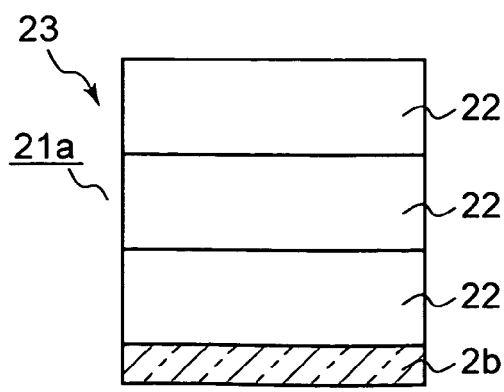
FIG. 37 is a diagram showing the film structure of the seventh embodiment of the present invention.
FIG. 38 is a cross-sectional view showing the seventh embodiment of the present invention.
Figure 39:
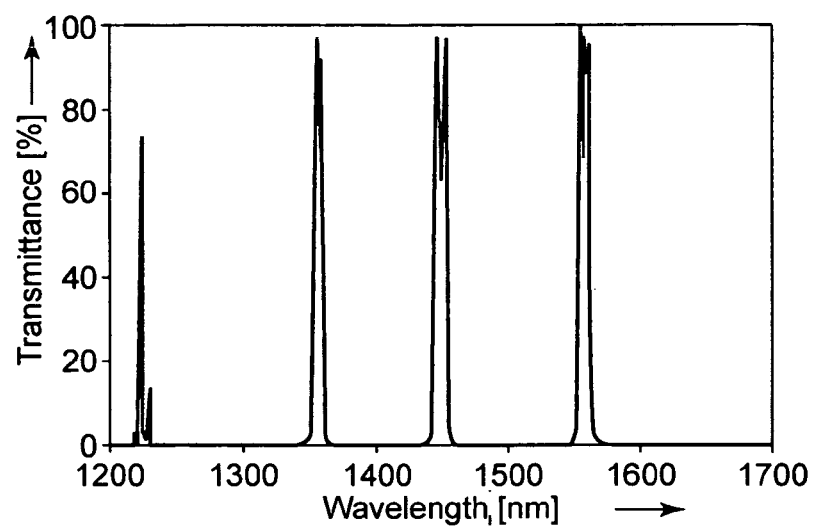
FIG. 39 is a diagram showing the transmittance characteristic of the seventh embodiment of the present invention.

The seventh embodiment will be explained next, referring to FIG. 36 to FIG. 39. FIG. 36 is a diagram showing the fundamental structure; FIG. 36(a) is a diagram showing the film structure; FIG. 36(b) is a cross-sectional view; FIG. 37 is a diagram showing the film structure of this embodiment; FIG. 38 is a cross-sectional view of this embodiment; and FIG. 39 is a diagram showing the transmittance characteristic of this embodiment.

This embodiment corresponds to the case in which all M and C are different from each other i.e. $(M_0 \neq M_1 \neq \ldots \neq M_i$, $C_1 \neq \ldots \neq C_i)$ for the abovementioned fundamental formula $[M_0(C_1M_1) \ldots (C_iM_i)T]^k$, and is represented by $[M_{1c}(C_{1c}M_{2c}) \ldots (C_{ic}M_{ic+1})T]^k$. This embodiment is based on the fundamental structure of ic=3 shown by FIG. 36, having three transmitting bands. The fundamental structure thereof is constituted as follows. The thin film superimposed layer portion 21 formed on the substrate 2b of optical glass (e.g. BK7 (trade name)) in FIG. 36 has the higher refractive index film H of the dielectric material $TiO_2$ with the refractive index n=2.22 having the optical film thickness of a quarter of the reference wavelength $\lambda$=1450 nm and the lower refractive index film L of the dielectric material $SiO_2$ with the refractive index n=1.44 having the optical film thickness of a quarter of the reference wavelength $\lambda$=1450 nm. The higher refractive index film H and the lower refractive index film L are superimposed alternately, and the film structure thereof is that X and Y of the fundamental formula are formed by H and L respectively.

The thin film superimposed layer portion 21 comprising one fundamental block 22 has the mirror layer $M_{1c}$ alternately superimposed like H, L, H, L, H, the cavity layer $C_{1c}$ represented by 2L, the mirror layer $M_{2c}$ alternately superimposed like H, L, H, the cavity layer $C_{2c}$ represented by 4L, the mirror layer $M_{3c}$ of H only, the cavity layer $C_{3c}$ represented by 6L, the mirror layer $M_{4c}$ alternately superimposed like H, L, H, L, H, L, H, and the matching layer T of L, all of these layers being superimposed in the order mentioned above from the surface side (air side). The transmittance characteristic thereof (not shown) is the three-peak characteristic where the transmitting regions of higher transmittance are provided at the reference wavelength $\lambda$=1450 nm and both sides thereof, which are interposed by two low transmitting region because of having three cavity layers C.

The multi-bandpass filter 23 of this embodiment has the structure in which the abovementioned fundamental block 22 is repeated three times for the thin film superimposed layer portion 21a provided on the substrate 2b as shown in FIG. 37 and FIG. 38, and is represented by $[M_{1c}(C_{1c}M_{2c})(C_{2c}M_{3c})(C_{3c}M_{4c})T]^3$ (where $M_{1c}$=H, L, H, L, H, $M_{2c}$=H, L, H, $M_{3c}$=H, $M_{4c}$=H, L, H, L, H, L, H $C_{1c}$=2L, $C_{2c}$=4L, $C_{3c}$=6L T=L).

The transmittance characteristic thereof is the three-peak characteristic where the transmitting regions of higher transmittance, which are interposed by two lower transmitting regions, are provided at the reference wavelength $\lambda$, both sides thereof, and the three transmitting bands of higher transmittance are spaced together at uneven distances as shown in FIG. 39. The three wavelength regions of higher transmittance are sufficiently separated from the wavelength regions of lower transmittance. The multi-bandpass filter 23 of this practical example has transmitting bands at three wavelength regions of approximately 1360 nm, 1450 nm, and 1560 nm.

Figure 40:
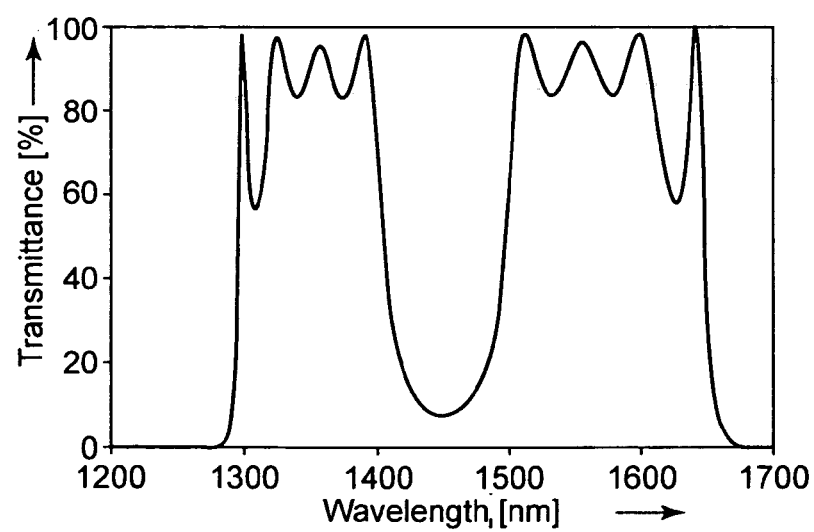
FIG. 40 is a diagram showing the transmittance characteristic of the eighth embodiment of the present invention.

Referring to FIG. 40, the eighth embodiment will be explained. FIG. 40 is a diagram showing the transmittance characteristic of this embodiment.

This embodiment corresponds to the case in which the mirror layer M is constituted of even times of layers and the cavity layer C is provided with both 2X and 2Y for the abovementioned fundamental formula without the abovementioned matching layer T: $[M_0(C_1M_1) \ldots (C_iM_i)]^k$, and is represented by $[M_0C_1M_1C_2M_2]^k$ where $M_0$=$M_2$=XY, $M_1$=YX, $C_1$=2X, $C_2$=2Y, and k=5. Therefore, the thin film superimposed layer portion (not shown) has the structure of $[(XY)(2X)(YX)(2Y)(XY)]^5$ which is provided with the fundamental structures of $[(XY)(2X)(YX)(2Y)(XY)]$ repeated five times, having two transmitting bands.

The thin film superimposed layer portion (not shown) formed on the substrate is comprised of the higher refractive index film H of the dielectric material $TiO_2$ with the refractive index n=2.22 having the optical film thickness of a quarter of the reference wavelength $\lambda$=1450 nm for X and the lower refractive index film L of the dielectric material $SiO_2$ with the refractive index n=1.44 having the optical film thickness of a quarter of the reference wavelength $\lambda$=1450 nm for Y.

The multi-bandpass filter of this practical example having the structure like the above has the transmittance characteristic as shown in FIG. 40, having transmitting bands at two wavelength regions of approximately 1300 nm to 1400 nm and 1520 nm to 1640 nm.

Figure 41:
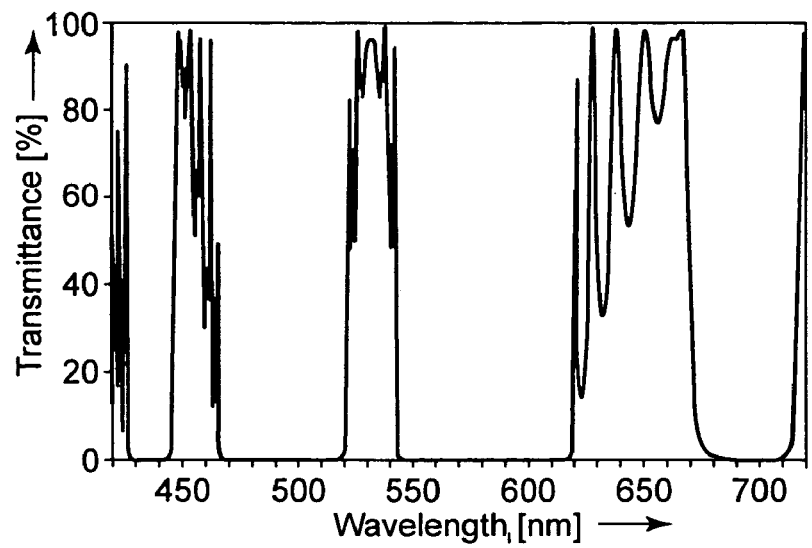
FIG. 41 is a diagram showing the transmittance characteristic of the ninth embodiment of the present invention.

Referring to FIG. 41, the ninth embodiment will be explained. FIG. 41 is a diagram showing the transmittance characteristic of this embodiment.

This embodiment corresponds to the case in which the cavity layer C is comprised of even times of X and Y, i.e. $C_1$=$C_3$=2X, $C_2$=2Y, the matching layer T being T=X, and the mirror layer M being $M_0$=$M_3$=YXY, $M_1$ and $M_2$ being omitted, based on the abovementioned fundamental formula $[M_0C_1M_1 \ldots C_iM_i(T)]^k$. This embodiment is represented by $[M_0C_1C_2C_3M_3(T)]^k$ and the fundamental structure thereof is $[(YXY)(2X)(2Y)(2X)(YXY)(X)]$. The thin film superimposed layer portion (not shown) of this embodiment has the structure of $[(YXY)(2X)(2Y)(2X)(YXY)(X)]^6$ which is provided with such fundamental structure repeated six times, having three transmitting bands.

The thin film superimposed layer portion (not shown) formed on the substrate is comprised of the higher refractive index film H of the dielectric material $TiO_2$ with the refractive index n=2.22 having the optical film thickness of a quarter of the reference wavelength $\lambda$=532 nm (green) for X and the lower refractive index film L of the dielectric material $SiO_2$ with the refractive index n=1.44 having the optical film thickness of a quarter of the reference wavelength $\lambda$=532 nm (green) for Y.

The multi-bandpass filter of this practical example with the reference wavelength $\lambda$ of green (532 nm) has the transmittance characteristic having three transmitting bands with higher transmittance, which can transmit the reference wavelength $\lambda$=532 nm (green), the wavelength region of blue and the wavelength region of red on both sides, which are interposed by two lower transmittance bands as shown in FIG. 41.

Figure 42:
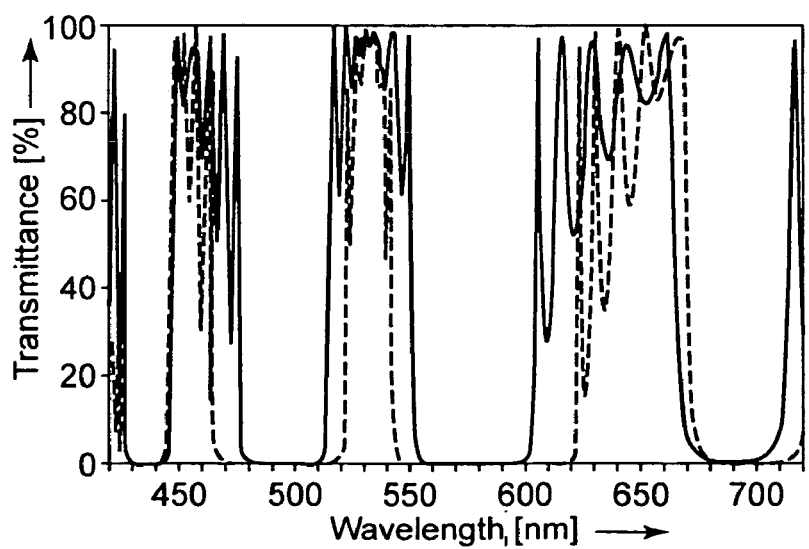
FIG. 42 is a diagram showing the transmittance characteristics of the tenth and eleventh embodiments of the present invention.
Figure 43:
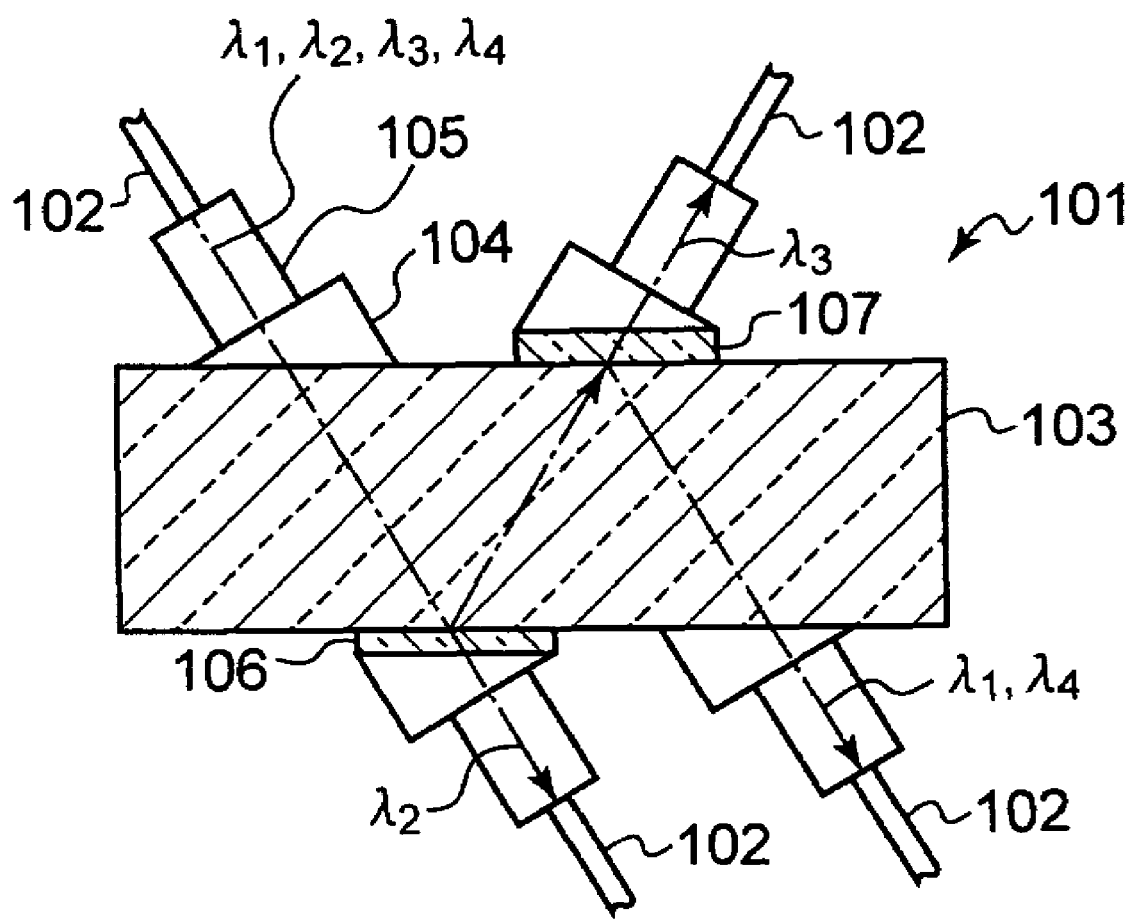
FIG. 43 is a cross-sectional view showing the conventional technology.

Referring to FIG. 42, the tenth embodiment will be explained. FIG. 42 is a diagram showing the transmittance characteristic of this embodiment.

Out of the structure $[(YXY)(2X)(2Y)(2X)(YXY)(X)]^6$ of the thin film superimposed layer portion in the ninth embodiment, one Y in the mirror layer M is replaced by a third dielectric V different from X and Y, and one 2X of the cavity layer C is replaced by 2V in this embodiment. Therefore, the thin film superimposed layer portion of this embodiment has the structure of $[(YXV)(2X)(2Y)(2V)(YXV)(X)]^6$, having three transmitting bands like the ninth embodiment.

The thin film superimposed layer portion (not shown) formed on the substrate is comprised of the higher refractive index film H of the dielectric material $TiO_2$ with the refractive index n=2.22 having the optical film thickness of a quarter of the reference wavelength $\lambda$=532 nm (green) for X and the lower refractive index film L of the dielectric material $SiO_2$ with the refractive index n=1.44 having the optical film thickness of a quarter of the reference wavelength $\lambda$=532 nm (green) for Y. The V comprises an intermediate refractive index film B having the optical film thickness of a quarter of the reference wavelength λ=532 nm(green) of the dielectric material $Al_2O_3$ with the refractive index n=1.63.

The multi-bandpass filter of this practical example with the reference wavelength λ of green (532 nm) has the transmittance characteristic having three transmitting bands with higher transmittance, which can transmit the reference wavelength λ=532 nm (green), the wavelength region of blue and the wavelength region of red on both sides, which are interposed by two lower transmittance bands as shown by the solid line in FIG. 42.

The eleventh embodiment will be explained referring to FIG. 42.

Out of the structure $[(YXY)(2X)(2Y)(2X)(YXY)(X)]^6$ of the thin film superimposed layer portion in the tenth embodiment, Y and X of one mirror layer M are replaced by third and fourth dielectrics Z and W different from X and Y, and one 2X of the cavity layer C is replaced by 2Z in this embodiment. Therefore, the thin film superimposed layer portion of this embodiment has the structure of $[(ZWY)(2X)(2Y)(2Z)(YXY)(X)]^6$, having three transmitting bands like the tenth embodiment.

The thin film superimposed layer portion (not shown) formed on the substrate is comprised of the higher refractive index film H of the dielectric material $TiO_2$ with the refractive index n=2.22 having the optical film thickness of a quarter of the reference wavelength λ=532 nm (green) for X and the lower refractive index film L of the dielectric material $SiO_2$ with the refractive index n=1.44 having the optical film thickness of a quarter of the reference wavelength λ=532 nm (green) for Y. The Z comprises a third refractive index film D having the optical film thickness of a quarter of the reference wavelength λ=532 nm (green) of the dielectric material $ZrO_2$ with the refractive index n=2.07, and the W comprises a fourth refractive index film E having the optical film thickness of a quarter of the reference wavelength λ=532 nm (green) of the dielectric material $MgF_2$ with the refractive index n=1.38.

The multi-bandpass filter of this practical example with the reference wavelength λ of green (532 nm) has the transmittance characteristic having three transmitting bands with higher transmittance, which can transmit the reference wavelength λ=532 nm (green), the wavelength region of blue and the wavelength region of red on both sides, which are interposed by two lower transmittance bands as shown by the dotted line in FIG. 42. The larger the difference of refractive indices between the V, Z, W having replaced the X, Y and the original X, Y in the tenth and the eleventh embodiments, the greater the change of the FWHM and the change of position of the peak become.

The present invention is not only referred to the embodiments mentioned above, but also to any other desired multi-bandpass filters based on setting properly the reference wavelength, number of the cavity layers C, numbers of higher refractive index films H and the lower refractive index films L of each mirror layer M and cavity layer C, number of repetition of the fundamental block, material of the substrate, material of the dielectric film to get desired optical performances. Furthermore matching layers can be established either on the surface or on the substrate or on both side of the superimposed structure having the fundamental blocks repeatedly superimposed like the fourth embodiment if necessary. Though X was the higher refractive index film H and Y was the lower refractive index film L in each embodiment mentioned above, X can be the lower refractive index film L and Y can be the higher refractive index film H. Moreover, a part of layers located on any position of the fundamental block can be replaced by a different third or fourth material.

What is claimed is:

1. A multi-bandpass filter comprising;
a substrate transparent to an object light; and
a thin film superimposed layer portion formed by at least mirror layers and cavity layers out of mirror layers, cavity layers and matching layers, comprising two kinds of dielectrics with different refractive indices, superimposed on the substrate as one unit, an optical film thickness thereof being a quarter of a reference wavelength, to form a plurality of Fabry-Perrot interferometer structures,
wherein the thin film superimposed layer portion has a structure represented by a fundamental formula of superimposition:

$$[M_0C_1M_1 \ldots C_iM_i(T)]^k \text{ or } [M_0C_1M_1 \ldots C_iM_i]^k$$

(where i and k are integers not less than 2),
when films of the dielectrics are represented by X and Y; the mirror layers are represented by M; the cavity layers are represented by C; and the matching layer is represented by T, where
M is a single layer, optical film thickness of films thereof being odd times of a quarter of the reference wavelength, or an alternating layer represented by [(2p+1)X, (2q+1)Y, ... ] of different dielectrics X and Y (where p, q, ... are zero or a positive integer respectively);
C is a single layer, optical film thickness of films thereof being even times of a quarter of the reference wavelength, or an alternating layer represented by [(2r)Y, (2s)X, ... ] of different dielectrics X and Y (where r, s, ... are zero or a positive integer respectively);
T is a single layer, optical film thickness of films thereof being odd times of a quarter of the reference wavelength.

2. The multi-bandpass filter as set forth in claim 1, wherein at least one of the dielectrics X and Y having the thickness of even times of a quarter of the reference wavelength is inserted alone or in plural into an arbitrary position of the structure represented by the fundamental formula.

3. The multi-bandpass filter as set forth in claim 1, wherein the thin film superimposed layer portion comprises matching layers on either the substrate side or a surface side, or both sides in order to make alignment with an outside of the thin film superimposed layer portion.

4. The multi-bandpass filter as set forth in claim 3, wherein the matching layers for making alignment with an outside of the thin film superimposed layer portion comprise films of the dielectrics, layers' number thereof being equal to number of fundamental block $[M_0C_1M_1 \ldots C_iM_i(T)]$ or more.

5. The multi-bandpass filter as set forth in claim 1, wherein the reference wavelength is 1450 nm; i being 2; and k being not less than 2.

6. The multi-bandpass filter as set forth in claim 1, wherein a part of the dielectric X or a part of the dielectric Y constituting the mirror layer M and the cavity layer C is replaced by at least one kind of dielectric having a refractive index different from that of the dielectrics X and Y for constructing the thin film superimposed layer portion.

7. A multi-bandpass filter comprising;
a substrate transparent to an object light; and
a thin film superimposed layer portion formed by mirror layers, cavity layers and a matching layer, comprising two kinds of dielectrics, both thereof being different from each other, superimposed on the substrate as one unit, an optical film thickness thereof being a quarter of a reference wavelength, to form a plurality of Fabry-Perrot interferometer structures, wherein the reference wavelength corresponds to a visible light, and the thin film superimposed layer portion is represented by $[M_0(2eY)M_1(2fY)M_2(2gY)M_3(Y)]^k$, or $[M_4(2eY)(2fX)(2gY)M_5(Y)]^k$, or $[M_6(2eY)M_7(2fX)M_8(2gY)M_9(X)]^k$, when the films of the dielectrics are represented by X and Y, and the mirror layer is represented by M, where $M_0$ to $M_5$ being one of X, XYX, XYXYX, XYXYXYX; $M_6$, $M_8$ being one of YX, YXYX, YXYXYX; and $M_7$, $M_9$ being one of XY, XYXY, XYXYXY; e, f, and g being integers not less than 1; k being an integer not less than 2; and central wavelengths of three peaks of a transmittance characteristic curve formed being equal to wavelengths of three primary colors i.e. blue, green and red, respectively.

8. A multi-bandpass filter comprising
a substrate transparent to an object light and a thin film superimposed layer portion comprising a higher refractive index film of a dielectric having an optical film thickness (532/4) nm and a lower refractive index film of a dielectric having the optical film thickness (532/4) nm, both the films being superimposed alternately, wherein the thin film superimposed layer portion is represented by $[X(2Y)X(2Y)X(2Y)X(Y)]^k$ when one of the higher refractive index film and the lower refractive index film is represented by X and the other thereof is represented by Y, where k is an integer not less than 2.

9. The multi-bandpass filter as set forth in claim 8, wherein the higher refractive index film is X; the lower refractive index film is Y; and k is 6.

10. The multi-bandpass filter as set forth in claim 9, wherein the higher refractive index film is formed by one of $TiO_2$, $Ta_2O_5$, $ZrO_2$, $Nb_2O_5$, $Al_2O_3$, and the lower refractive index film is formed by $SiO_2$.

* * * * *